United States Patent [19]
Uekusa et al.

[11] Patent Number: 5,122,953
[45] Date of Patent: Jun. 16, 1992

[54] WORD PROCESSOR FOR AUTOMATICALLY DEFINING THE POSITION, SIZE, AND FORM OF A SYMBOL AND FORMULA

[75] Inventors: Akihiko Uekusa, Funabashi; Shinko Sugiyama, Yokohama; Masaki Hamada, Yokohama; Akifumi Shirasaka, Yokohama; Tetsuaki Yaguchi, Kawasaki, all of Japan

[73] Assignee: Canon Kabushiki Kaisha, Tokyo, Japan

[21] Appl. No.: 400,768

[22] Filed: Aug. 30, 1989

[30] Foreign Application Priority Data

Aug. 31, 1988 [JP] Japan ................... 63-216942
Aug. 31, 1988 [JP] Japan ................... 63-216952
Aug. 31, 1988 [JP] Japan ................... 63-216960

[51] Int. Cl.⁵ ............... G06F 15/38; G06F 15/00
[52] U.S. Cl. .................. 364/419; 395/146; 395/144; 395/149
[58] Field of Search ............ 364/518, 521, 419

[56] References Cited

U.S. PATENT DOCUMENTS

| | | | |
|---|---|---|---|
| 4,710,885 | 12/1987 | Litteken ................ | 364/518 |
| 4,723,209 | 2/1988 | Hernandez et al. ...... | 364/518 |
| 4,815,029 | 3/1989 | Barker et al. .......... | 364/900 |
| 4,829,470 | 5/1989 | Wang ................... | 364/521 |

OTHER PUBLICATIONS

Microsoft Word, 1984, (Formula, pp. 98–105) (for the Apple Macintosh).

*Primary Examiner*—Dale M. Shaw
*Assistant Examiner*—Xuong Chung
*Attorney, Agent, or Firm*—Fitzpatrick, Cella, Harper & Scinto

[57] ABSTRACT

A word processor capable of creating a formula during a document editing process by automatically setting a range of a formula in a document being edited with an instrument of a formula process start command and allowing a switching operation between the document editing process and the formula creating process to be easily made. This allows the formula to be edited on a block basis, thereby facilitating the editing operation such as modification, addition, or deletion of the formula in accordance with any editing of character trains or symbols inside and outside the formula in a well-balanced manner. The word processor is also capable of automatically defining the position, size, and form of a symbol in accordance with the length and form of an object to which the symbol is to be added, so that the position, size, and form of the symbol can be automatically accommodated in accordance with any change in the object to which the symbol is to be added without bothering an operator. The word processor is further capable of not only adding a symbol to an already input text, but also inputting paired symbols which are mutually spaced apart such as a pair of parentheses with a single input operation.

13 Claims, 27 Drawing Sheets

FIG. 2
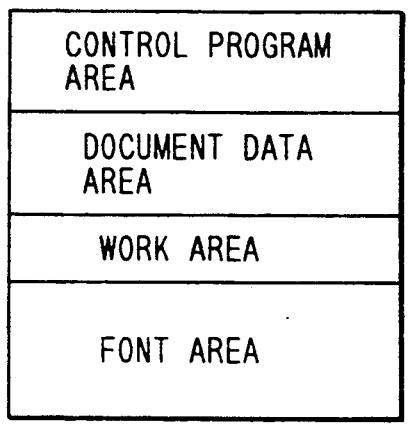
FIG. 3
(1) CHARACTER DATA TO BE EDITED
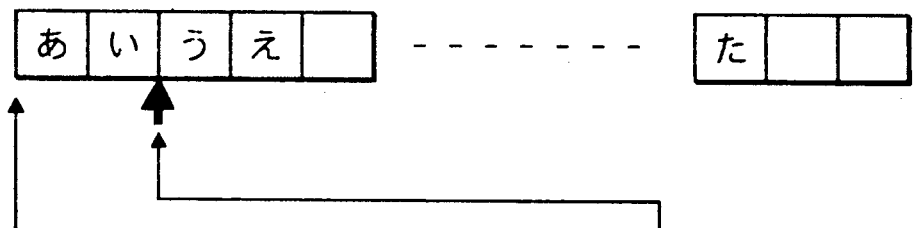
(2) CONTROL INFORMATION FOR CHARACTER EDITING
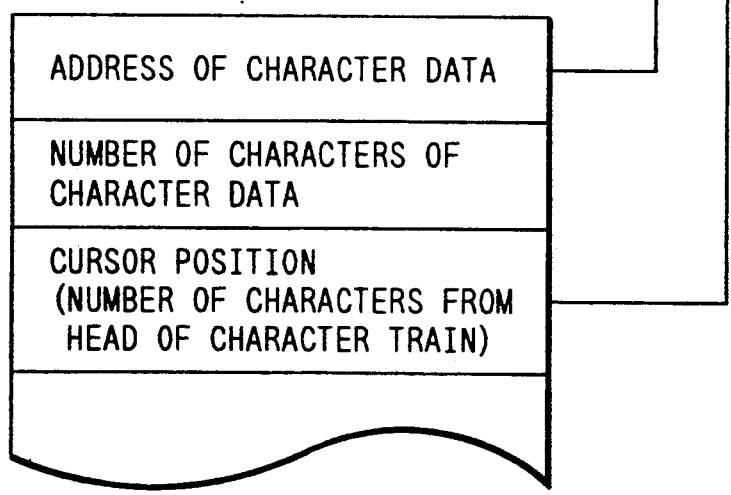

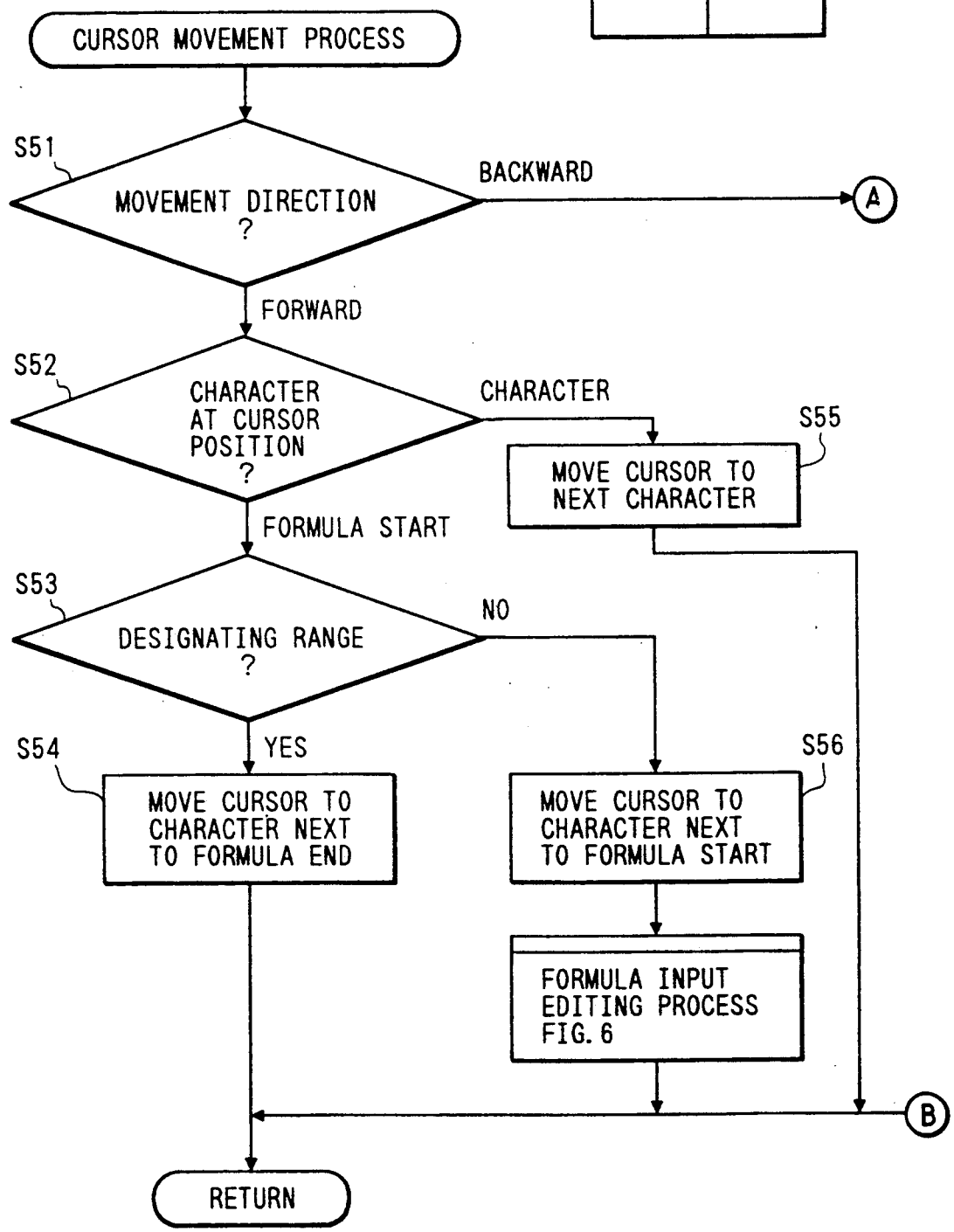

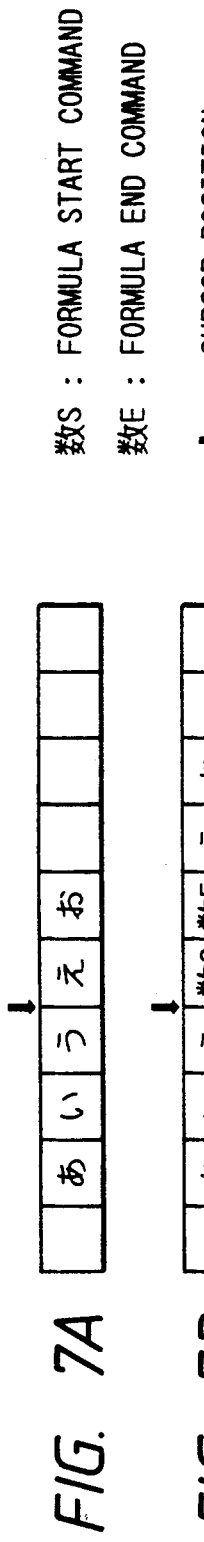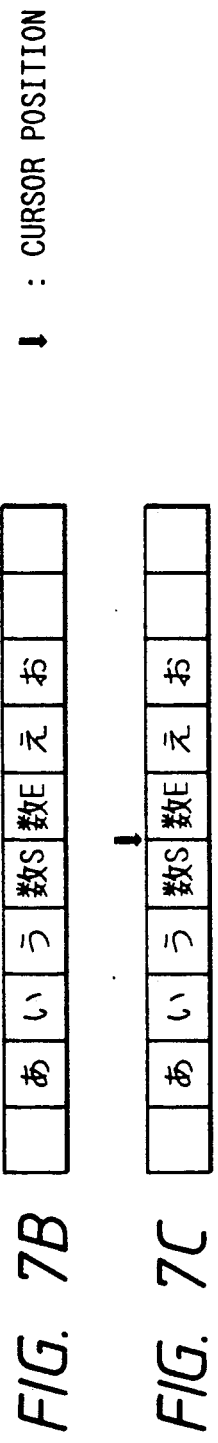

となる。 $\varepsilon = 2^{-m} = 2\sin\frac{\Delta\theta}{2}$ とすれば、真円からの誤差Eは

$$E = \frac{\dfrac{r\cos\frac{\Delta\theta}{2}}{\sqrt{1-\sin\frac{\Delta\theta}{2}}} - r}{r} \times 100 \quad (\%)$$  —82

$$\fallingdotseq \frac{1}{2^{m+2}} \times 100 \quad (\%)$$  —83

となる。

..........................

交点Pは、 $P = P_0 + \dfrac{S_0}{S_0 - S_1} \cdot (P_1 - P_0)$ で与えられる。  —84

| y | は | 数 S | 数 E | で | 求 | め | ら | れ | る |

FIG. 10C

| y | は | 数 S | y | = | 数 E | で | 求 | め | ら | れ | る |

FIG. 10E

| y | は | 数 S | y | = | ルS | 数 E | ルE | で | 求 | め | ら | れ | る |

数S : FORMULA・START COMMAND
数E : FORMULA・END COMMAND
ルS : SQUARE ROOT・START COMMAND
ルE : SQUARE ROOT・END COMMAND
↑ : CURSOR POSITION

FIG. 10G

| y | は | 数S | y | = | ルS | s | i | n | ルE | 数E | で | 求 | め | ら | れ | る |

FIG. 10H yはy=√sinで求められる

FIG. 10I

| y | は | 数S | y | = | ルS | s | i | n | 分S | 分SP | 分E | ルE | 数E | で | 求 | め | ら | れ | る |

FIG. 10J yはy=√sin—で求められる

数S : FORMULA·START COMMAND
数E : FORMULA·END COMMAND
ルS : SQUARE ROOT·START COMMAND
ルE : SQUARE ROOT·END COMMAND
分S : FRACTION·START COMMAND
分SP : FRACTION·SEPARATOR COMMAND
分E : FRACTION·END COMMAND
↓ : CURSOR POSITION

FIG. 10K

| y | は | 数$S$ | y | = | ル$S$ | s | i | n | 分$S$ | 2 | 分$SP$ | ル$E$ | 分$E$ | 数$E$ | で | 求 | め | ら | れ | る |

FIG. 10L $$y は y = \sqrt{\sin\frac{\phantom{1}}{2}} で求められる$$

FIG. 10M

| y | は | 数$S$ | y | = | ル$S$ | s | i | n | 分$S$ | 2 | 分$SP$ | 1 | 分$E$ | ル$E$ | 数$E$ | で | 求 | め | ら | れ | る |

FIG. 10N $$y は y = \sqrt{\sin\frac{1}{2}} で求められる$$

数$S$ : FORMULA·START COMMAND
数$E$ : FORMULA·END COMMAND
ル$S$ : SQUARE ROOT·START COMMAND
ル$E$ : SQUARE ROOT·END COMMAND
分$S$ : FRACTION·START COMMAND
分$SP$ : FRACTION·SEPARATOR COMMAND
分$E$ : FRACTION·END COMMAND
↓ : CURSOR POSITION

FIG. 10O

| y | は | 数S | = | ルS | s | i | n | 分S | 2 | 分SP | 1 | 分E | × | ルE | 数E | で | 求 | め | ら | れ | る |

↑

数S : FORMULA·START COMMAND
数E : FORMULA·END COMMAND
ルS : SQUARE ROOT·START COMMAND
ルE : SQUARE ROOT·END COMMAND
分S : FRACTION·START COMMAND
分SP : FRACTION·SEPARATOR COMMAND
分E : FRACTION·END COMMAND
↑ : CURSOR POSITION

FIG. 10P $$y は y = \sqrt{\sin\frac{1}{2} \times} で求められる$$

FIG. 12

| | | |
|---|---|---|
| SUPERSCRIPT | ---------- | $A^n$ |
| SUBSCRIPT | ---------- | $A_i$ |
| FRACTION | ---------- | $\dfrac{1}{123}$ |

FORMULA COMMAND

| | | |
|---|---|---|
| $\Sigma$ | -------- | $\sum_{i=1}^{n}$ |
| $\Pi$ | -------- | $\prod_{i=1}^{n}$ |
| $\int$ | -------- | $\int_{0}^{100}$ |
| $\oint$ | -------- | $\oint_{123}$ |
| $\cup$ | -------- | $\bigcup_{k=0}^{m}$ |
| $\cap$ | -------- | $\bigcap_{k=0}^{m}$ |
| lim | -------- | $\lim_{n \to \infty}$ |
| $\sqrt{\phantom{x}}$ | -------- | $\sqrt{123}$ |
| $\overline{AB}$ | -------- | $\overline{XY}$ |
| $\vec{AB}$ | -------- | $\vec{PQ}$ |
| $\begin{pmatrix} a & b \\ c & d \end{pmatrix}$ | -------- | $\begin{pmatrix} 123 & 1 \\ 1 & 123 \end{pmatrix}$ |
| $\{\ \}$ | -------- | $\{\ 123\ \}$ |

FIG. 17A
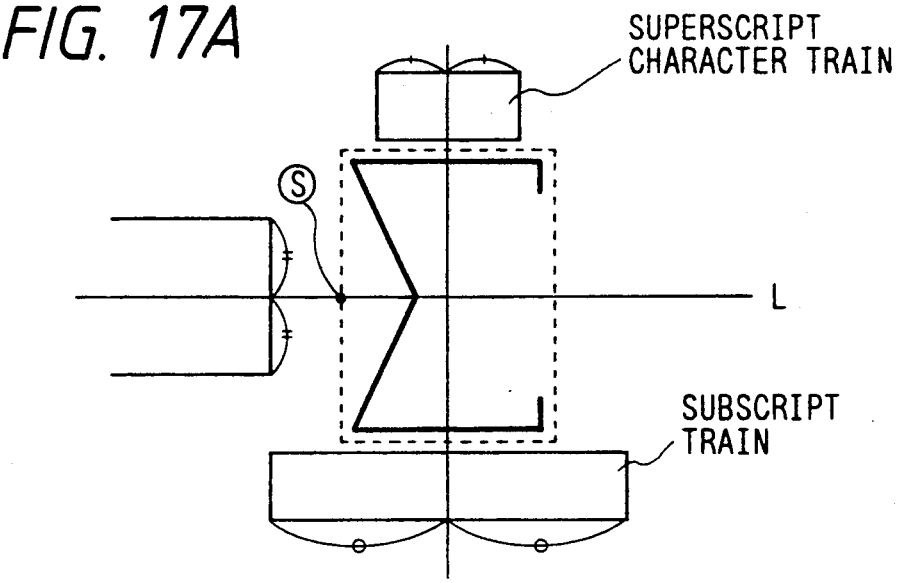
SUPERSCRIPT CHARACTER TRAIN
SUBSCRIPT TRAIN
FIG. 17B
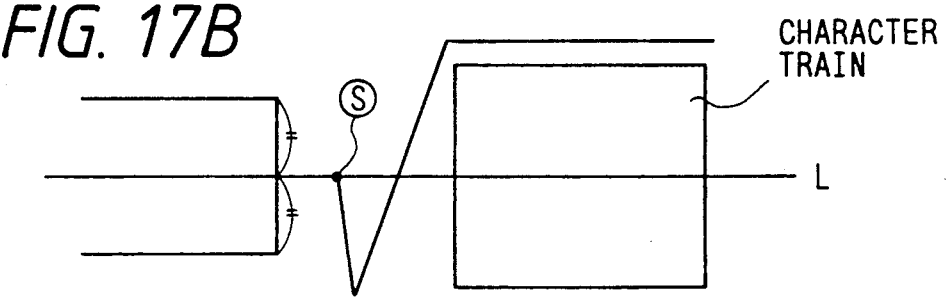
CHARACTER TRAIN
FIG. 17C
$$n = \frac{1}{123} + \sum_{i=0}^{m} + \sqrt{123} \quad\text{---} L$$
FIG. 17D
$$\sum_{i=0}^{m} + \sqrt{123} \quad\text{---} L_1$$
$$n = \frac{}{123} \quad\text{---} L$$

WORD PROCESSOR FOR AUTOMATICALLY DEFINING THE POSITION, SIZE, AND FORM OF A SYMBOL AND FORMULA

BACKGROUND OF THE INVENTION

1. Field of the Invention

This invention relates to word processors and more particularly to a word processor having a function of creating documents including a character-symbol train having a special position and size such as a formula.

2. Related Background Art

Conventionally, to create a document including a formula such as is shown in FIG. 8, the input of the formula portions 81, 82, 83 are processed separately from that of the ordinary text by defining a floating block or a fixed block to perform therein the input and creation of the formula by combining a plurality of lines of character trains using, where necessary, a command such as modification of the line pitch.

However, the above method, in which the input areas are separately defined for text and formulas, is disadvantageous in that not only is an additional step required for the operation of defining a block for the input of a formula, but also the operation of re-defining the block size when the size of the formula must be increased during the input/editing operation is required.

Further, if a formula is created by combining ordinary characters without defining a separate input area therefor, the formula cannot be processed as a block, and thus input/editing operation of any portion other than the formula will cause only the formula portion to move, whereby a problem of not only destroying the created formula but also not allowing complicated formulas to be created exists.

Furthermore, there is another method involving the steps of suspending a document editing process being currently performed, creating a formula portion separately from the document, and combining the created formula portion with the document. However, this method also requires cumbersome formula input operations; in order to perform editing such as correcting the formula portion with this method, it is necessary to repeat the above steps of creating a formula and combining it with the document.

Now, apart from the relation between the document and the formula, let us refer to the input of symbols such as formulas. One conventional method requires the input of commands, for example, "SQUARE ROOT [X+Y]" or "A SUFFIX i" to input a formula with a square root or a character with a subscript, which means that it is necessary to input additional characters and symbols which are completely different from what is desired as a final product: "X +Y" and "Ai"

Further, although in the ordinary method of adding, for example, a square root symbol, the form, size, and position of the square root are defined in accordance with the size of an object to which the square root is to be added, some conventional word processors follow a simple expression which is different from that ordinary method. In defining the form of the square root in accordance with the character train to which the square root is to be added, the operator has to make his or her decision with reference to the displayed or printed results. This method requires repetition of the same input operation until one suitable form, size or the like of the symbol is selected and defined, and as a result, it entails not only much time but also hard work on the part of the operator even burdening him or her with a risk of making errors.

In the case where the length of the character train to which the square root symbol is to be added must be modified due to an editing operation such as correction, and the position and form of the square root have to be revised, the above method requires that a completely new round of input operations be executed; it is not possible to make a partial correction such as to only input a new square root symbol to the already input character train.

Further, a formula such as a fraction, in which a term taking up a plurality of lines and a term taking up only a single line are included, imposes a problem of producing a bottom-aligned, ill-balanced display when expressed with reference to a single base line. A numerator displayed in left- or right-aligned form does not look good, either. Thus, in order to express the fraction in a well-balanced, good-looking manner, it is necessary to define the position in accordance with the size and form of its constituents. As is the case with the input of the square root, the operator has to follow the steps of defining and editing the position with reference to the output results, and if the output does not look good, he has to repeat a series of steps all over again.

Furthermore, as to paired symbols which are to be arranged mutually spaced apart such as a pair of parentheses, each is input separately; thus the problem exists in that, in the case of a pair of parentheses, the closing parenthesis is often missing.

SUMMARY OF THE INVENTION

An object of this invention is to provide a word processor capable of the creating formulas during a document editing process by automatically setting a range of formula in the document being edited with an instruction of a formula process start command and allowing a switching operation between the document editing process and the formula creating process to be easily effected.

Another object of this invention is to provide a word processor capable of automatically modifying the size of the range of the formula in accordance with the increasing or decreasing data size within the set range of the formula.

A further object of this invention is to provide a word processor capable of editing a formula created in a document at any given time by processing the created formula as one blocked range.

Still another object of this invention is to provide a word processor capable of automatically defining the position, size, and form of a symbol in accordance with the length and form of an object to which the symbol is to be added.

Still another object of this invention is to provide a word processor capable of modifying the position, size, and form of a symbol in accordance with an object to which the symbol is to be added when the object to which the symbol is to be added is edited.

Still another object of this invention is to provide a word processor capable of adding a symbol to an already input character train.

Still another object of this invention is to provide a word processor capable of simultaneously inputting paired symbols which are to be arranged mutually spaced apart such as a pair of parentheses with a single input operation.

BRIEF DESCRIPTION OF THE DRAWINGS

FIG. 2 is an explanatory diagram showing the main memory;

FIG. 3 is a diagram showing a relationship between character data and control information;

FIG. 5 shows how FIGS. 5A and 5B are interconnected;

FIGS. 5A and 5B are flowcharts showing the cursor movement process;

FIGS. 7A to 7C are diagrams showing the cursor positions at the time of the formula creation;

FIG. 8 is a diagram showing an example of a document including a formula;

FIGS. 9A and 9B are diagrams showing examples of the data structure of a formula;

FIGS. 10A to 10P are diagrams showing examples of changes in the data structure at the time of the formula input;

FIG. 12 is a diagram showing an example of the type and use of formula commands;

FIGS. 17A to 17D are diagrams showing examples of the setting output position;

DETAILED DESCRIPTION OF THE PREFERRED EMBODIMENTS

Figure 1:
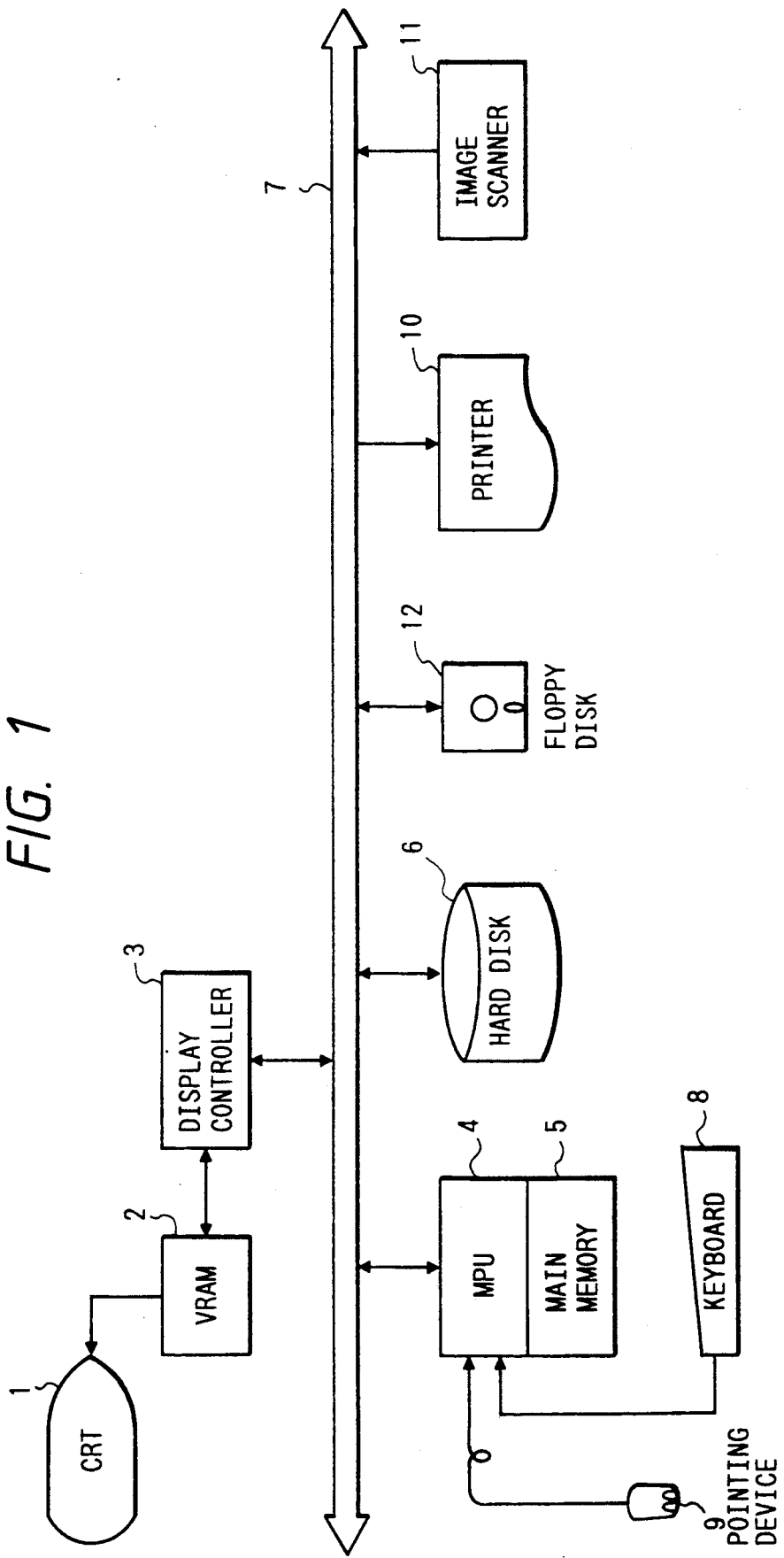
FIG. 1 is a block diagram of the work processor according to the present invention.

This invention will be explained in detail with reference to drawings. FIG. 1 is a system block diagram of an embodiment of a word processor according to this invention. The system comprises a CRT section 1 which is a raster scanning type display device; a video RAM (VRAM) 2 for storing display pattern information for a full screen; a display control section 3 for controlling both writing to the VRAM 2 and supplying out to the CRT 1 of the pattern information; a microprocessor 4 (MPU), which forms a main control section of this word processor; a main memory 5 having areas, such as shown in FIG. 2, for storing control programs including document data, fonts, and tables such as shown in FIG. 3, FIGS. 4A, 4B, FIGS. 6A, 6B, FIG. 8, and FIGS. 9A, 9B; both a keyboard 8 for inputting characters, symbols, commands or the like and a pointing device 9 (hereinafter referred to as P.D.) for instructing positions on the CRT 1 and editing input data such as graphics thereon are connected to the MPU 4; a hard disk device 6, in which document files and character fonts are stored; a printer 10 for printing a created document; an image scanner 11 for reading image data such as graphics; a floppy disk device 12 for storing document files or the like. These constituent blocks are interconnected via an I/0 bus 7.

The word processor thus configured can display characters spacing, character arrangement, and their printing formats on the CRT in accordance with a composition rule, and can perform versatile document editing on an arbitrary area or on a reserved area in the arbitrary area using the keyboard and the P.D., thus comprising functions of editing character and symbol inputs, editing graphic inputs such as lines, rectangles, circles, ellipses or the like using the P.D., editing image data inputs such as graphics using the image data scanner and the P.D., and printing created document data or the like.

Figure 4A:
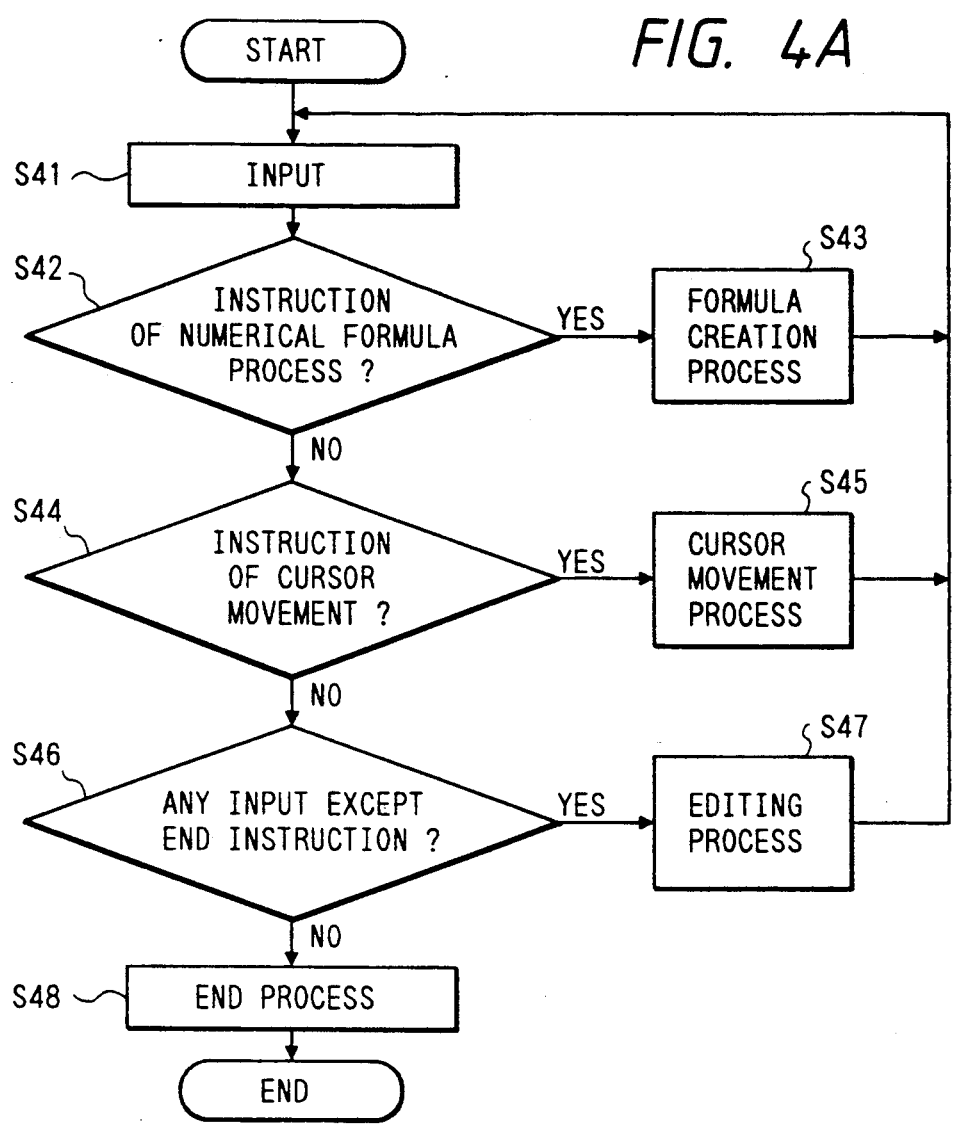
FIG. 4A is a flowchart of the entire control.
Figure 4B:
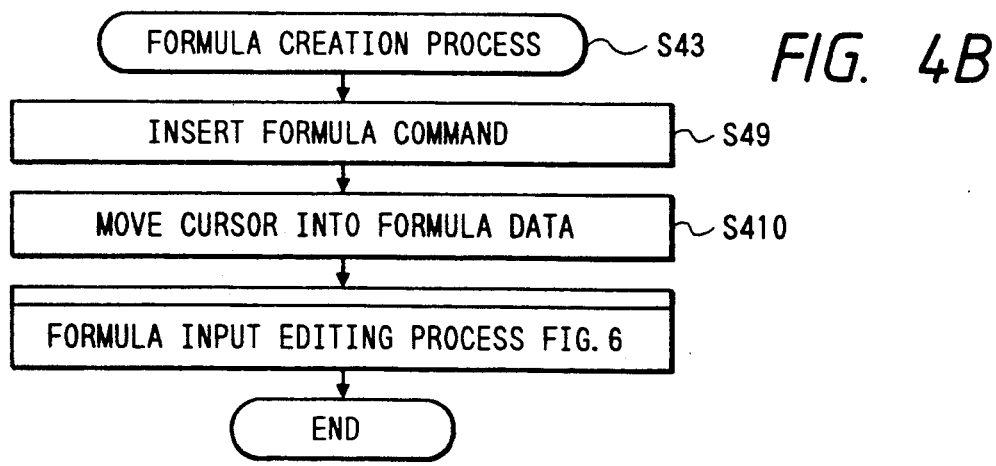
FIG. 4B is a flowchart of the formula creation process.
Figure 5B:
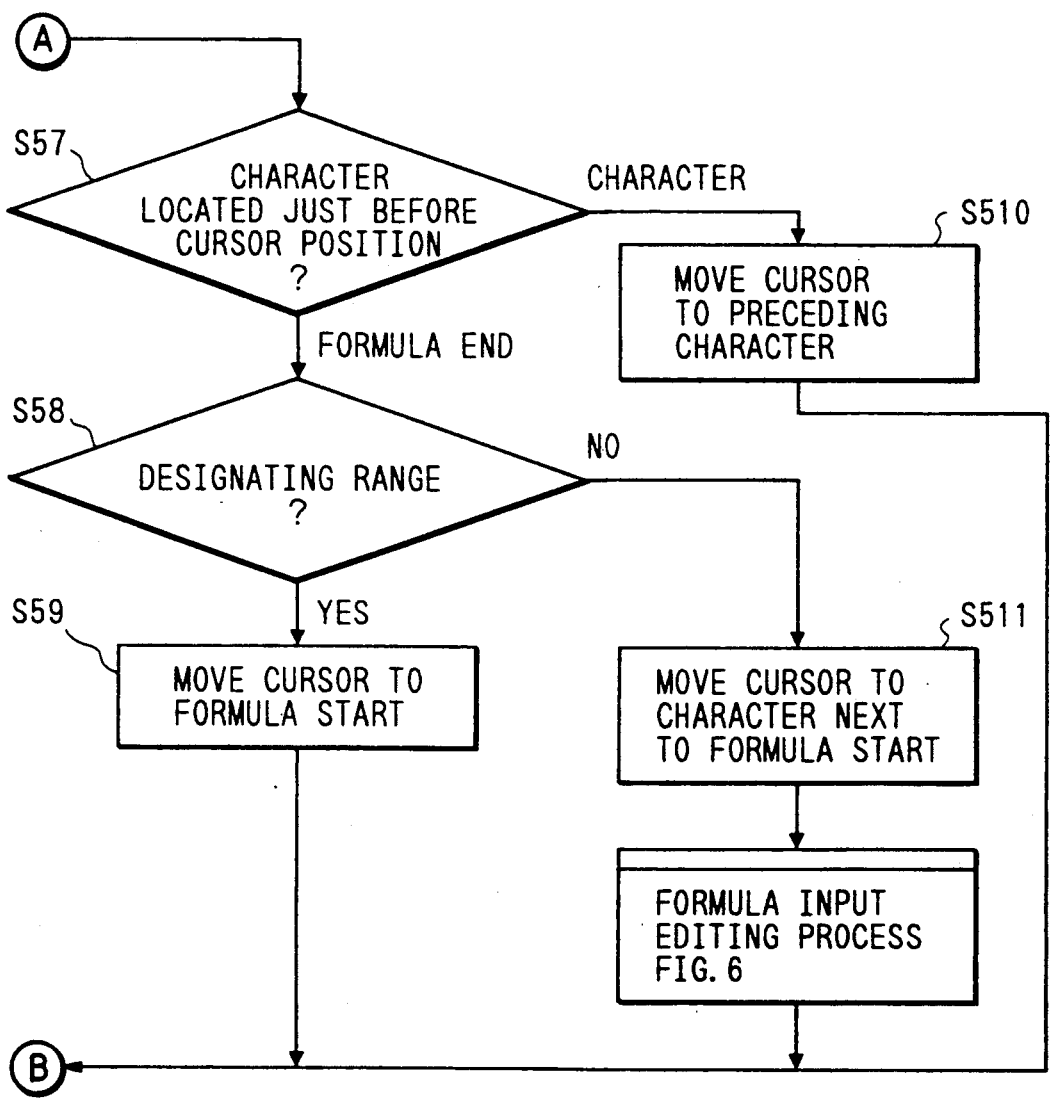
Figure 6A:
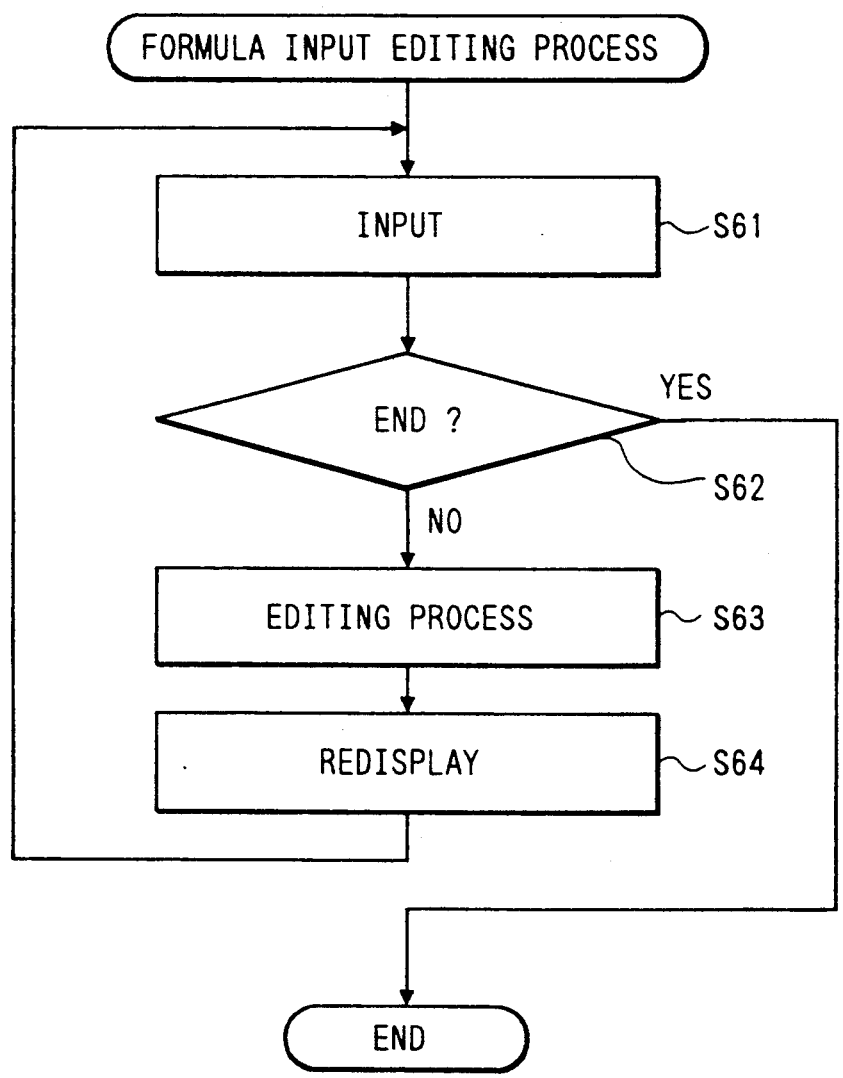
FIG. 6A is a flowchart of the formula editing process.
Figure 6B:
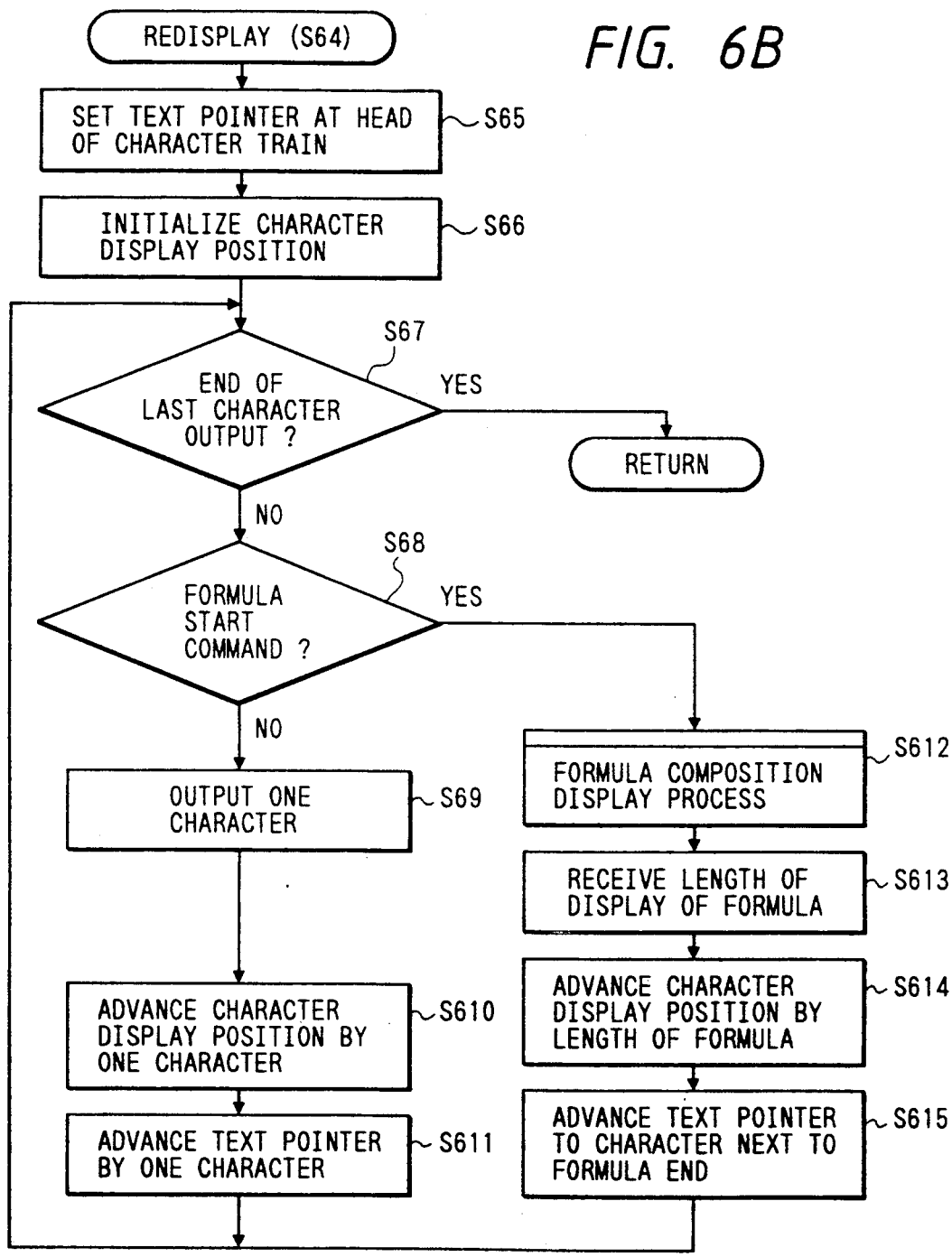
FIG. 6B is a flowchart of the redisplay process.

FIG. 3 shows a state of character data to be edited on the main memory 5 and an example of control information to be used for the editing. FIGS. 4A, 4B are flowcharts showing the entire flow of all the processes and the formula creation process. FIGS. 5A, 5B are flowcharts showing the cursor movement process. FIGS. 6A, 6B are flowcharts showing the formula editing process and the redisplay process, and FIGS. 7A to 7C are diagrams showing the character data and the cursor positions at the time of formula creation.

There now follows an explanation of a process of inputting, editing, and displaying character data containing formulas as shown in FIG. 8 with reference to FIG. 3, FIGS. 4A, 4B, FIGS. 5A, 5B, FIGS. 6A, 6B, and FIGS. 7A to 7C.

Upon the start of a character input/editing process, an input is received by step S41 in FIG. 4A. The type of the input is checked by step S42, and if the input instructs the inputting of a formula process, the system proceeds to step S43. In the formula creation process in step S43, the formula start command and the formula end command are inserted at the position on the character train indicated by the cursor for character editing control information in FIG. 3 by step S49, whereby the state of the character train shown in FIG. 7A is changed to that in FIG. 7B. Step S410 in FIG. 4B moves the cursor between the inserted formula start command and formula end command, the state of the character train is further changed to that shown in FIG. 7C. Then, the system starts the formula input/editing process and returns to step S41 upon end of the process. If the input does not instruct the formula process when its type is checked by step S42, it is checked again by step S44. If it is found out that the input instructs the movement of the cursor, the system proceeds to step S45 for the cursor movement process. In the cursor movement process, the movement direction is checked by S51 in FIG. 5A. If a forward movement is instructed, step S52 checks a character on which the cursor is currently positioned. If the formula start command is instructed, step S53 checks that a range is being designated. Here, the character train whose range has been designated is subject to deletion or movement on a block basis. To process the formula as a block, in the case where its range has been designated, step S54 moves the cursor to a character next to the formula end command, while if its range has not been designated, step S56 moves the cursor to a character next to the formula start command. Then, the system starts the formula input/editing process shown in FIG. 6A and returns to step S41 upon the end of the process.

If a backward direction is instructed in step S51, the system checks a character which is immediately left of the current cursor position with step S57. If the formula end command is instructed, the system checks that a range is being designated by step S58. If the range has been designated, step S59 moves the cursor to the formula start command, while if the range has not been designated, step S511 moves the cursor to a character next to the formula start command. Then, the system starts the formula input/editing process shown in FIG. 6A and returns to step S41 upon end of the process.

If the input checked by step S44 in FIG. 4A does not instruct the cursor movement, it is checked again by step S46. If it is found out that the input instructs the end process, the end process is performed by step S48 and the character editing is completed. If it does not instructs the end process, the system proceeds to step S47 to perform a corresponding editing process and returns to step S41 upon the end of the process.

In the formula input/editing process, as shown in FIG. 6A, the system receives an input with and step S61, checks it with step S62, proceeds to step S63 if the input instructs other than the end process, redisplays the edited data with step S64, and returns to step S61 to wait for a new input. If the input checked by step S62 instructs the end process, the system ends the formula input/editing process.

In the redisplay process, step S65 shown in FIG. 6B sets a text pointer for pointing a character to be displayed to the head of the character display position to the head of the character train, and step S66 sets an initial value of character display position which indicates the position on which to display the character, and then step S67 displays the character train by repeating the steps later than step S67. Step S67 checks that the display end is requested, while step S68 checks that the character is an ordinary character to be displayed or a command. If it is an ordinary character, the system displays the character on a one-character basis with each of steps S69, S610, S611 and then returns to step S67. If it is found out by step S68 that the character is the formula start command, step S612 calls the formula composition display process to display the formula portion, step S613 receives the length of the displayed formula, step S614 advances the character display position for the next character by the size of the formula, step S615 advances the text pointer to the next character of the formula end command. Then, the system returns to step S67.

Any change in the length of a formula as a result of input/editing process being performed on the formula by steps S613, S614 can be accommodated by an automatic change in the size of the block of formula at every redisplay, thereby allowing the entire character data to be correctly composed.

In this way, the formula creation and modification can be performed without requiring any special operation during ordinary character editing, and in addition to this, any modification in the size of the created formula due to an input/editing operation can be automatically reflected in the character data composition process during editing.

FIGS. 9A, 9B are diagrams showing an example of the data structure of a formula and a display example of the formula and FIGS. 10A to 10P are diagrams showing examples of changes in the data structure made by the formula input/editing process and corresponding changes in the display.

An example of proceeding with the formula input/editing process will now be set forth with reference to FIGS. 9A, 9B and FIGS. 10A to 10P. The example refers to a case where the formula shown in FIG. 9A will be created as a new input.

(1) Instruct the performing of the formula process by a character editing process (steps S42→S43). The formula start command and the formula end command are inserted at the cursor position, and the cursor is caused to move to the position next to the formula start command. The data becomes as shown in FIG. 10A (step S410 in FIG. 4B).

(2) Input "y=". The data becomes as shown in FIG. 10C and is displayed as shown in FIG. 10D.

(3) Instruct the creation of a "square root". The square root start command and the square root end command are inserted at the cursor position, and the cursor is caused to move to the position next to the square root start command. The data becomes as shown in FIG. 10E and a square root symbol is displayed as shown in FIG. 10F.

(4) Input "sin". The data becomes as shown in FIG. 10G and is displayed as shown in FIG. 10H.

(5) Instruct the creation of a "fraction". The fraction start command, the fraction separator command, and the fraction end command are inserted to the cursor position, and the cursor is caused to move to the position next to the fraction start command. The data becomes as shown in FIG. 10I and a fraction line is displayed as shown in FIG. 10J.

(6) Input "2" and move the cursor. The data becomes as shown in FIG. 10K and "2" is displayed on the denominator side as shown in FIG. 10L.

(7) Input "1" and move the cursor. The data becomes as shown in FIG. 10M and "1" is displayed on the numerator side as shown in FIG. 10N.

(8) Input "x". The data becomes as shown in FIG. 10O and is displayed as shown in FIG. 10P.

According to the above procedures, the text including a formula shown in FIG. 8 can be created and displayed.

The above input/editing process of character data including a formula as aforesaid is likewise applicable not only to character data extending in a plurality of pages and character data within a range designated by a fixed block or floating block, but also to character data included in graphic data and table data.

The above explanation refers to a case where only the formula command is instructed, but it is similarly applicable to a case where other commands such as character modification functions are conjointly instructed by expanding the editing and display processes.

As explained above, according to this invention, the creation and modification of a formula can be performed without requiring any complicated preparatory operation, and in addition to this, any modification in the size of the created formula resulting from an editing operation can be automatically reflected in the character data composition during editing. This is advantageous in that a document including a complicated formula such as is shown in FIG. 8 can be created easily.

Moreover, since the entire formula portion can be processed as one character, it is possible to readily provide a character modification function such as block in which, as shown at reference numeral 84 of FIG. 8, the formula portion and the non-formula, ordinary character portions are bound together.

Not only can character modification functions such as block, underline, overline be performed, but also a right margin adjustment process such as word wrap for not breaking a word into two word at a line end can likewise be performed.

As described above, according to this invention, it is possible to easily designate a range of a formula in a document and to automatically modify the size of the range of formula in accordance with the increasing or decreasing size of data within the range of a formula.

According to this invention, it is possible to block a formula and thus to process a created formula as one block when the formula is subjected to a re-editing process.

A method of composing symbols including formulas in a well-balanced manner will now be explained. This method involves instruction of a reference point and a base line, definition of the output positions of mathematic symbols such as as fraction, matrix, square root, and $\Sigma$, and of their subscripts based on the designated reference point and base line, and automatic arrangement and display of the formula symbols in a well-balanced manner.

This method enables the symbols to be well-balanced and neatly aligned with respect to the entire document, and when a correction or addition is made to the formula, the corrected or added formula is quickly displayed in a well-balanced manner by automatically re-adjusting its output position. This method further allows complicated formulas including combinations of a fraction and a square root to be displayed in a well-balanced manner.

Figure 11:
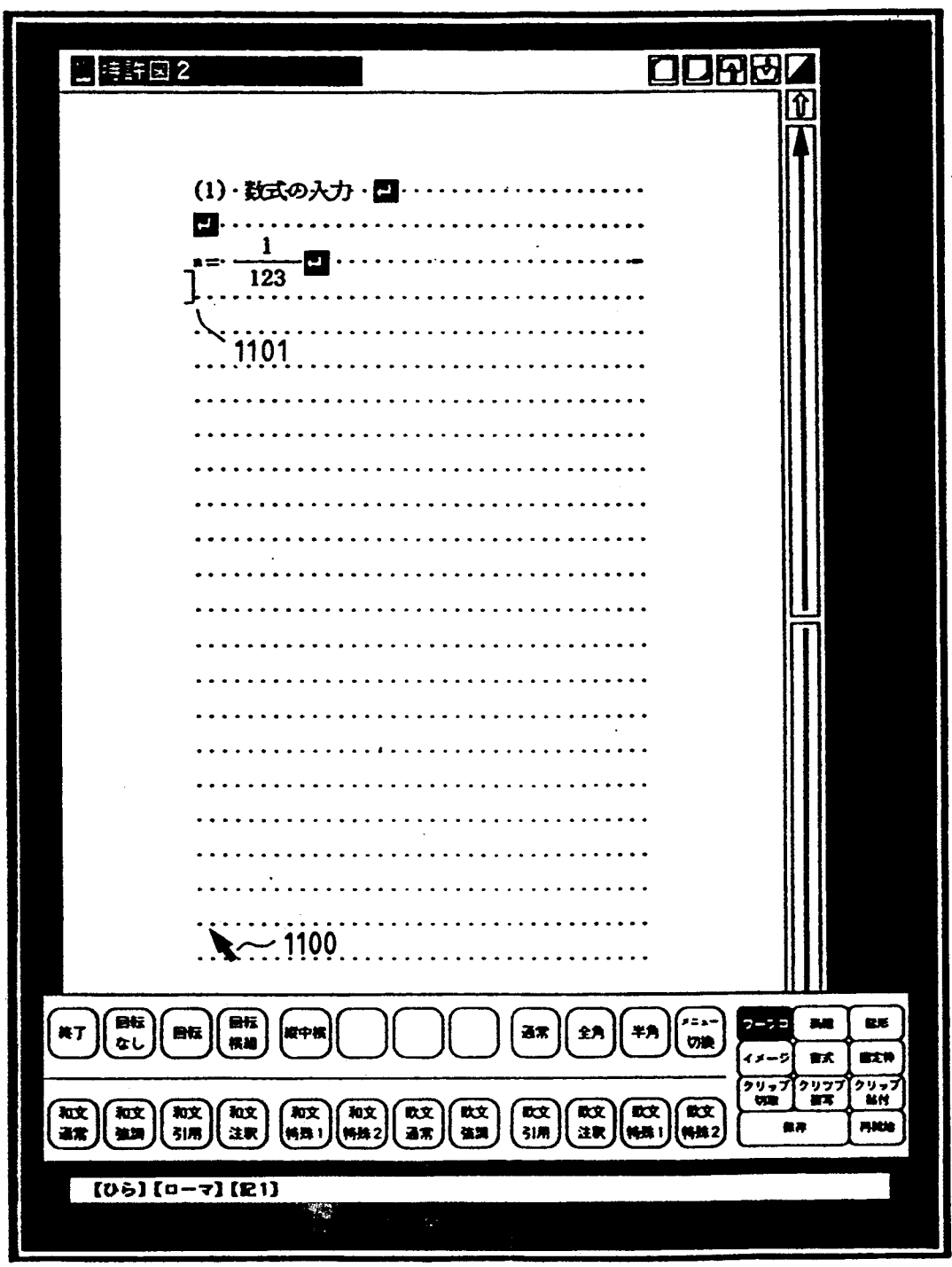
FIG. 11 is a diagram showing an example of the display at the time of the formula input.

There now follows an explanation of a method of displaying in a well-balanced manner a text in which ordinary characters and symbols such as formulas are mixed with reference to the document shown as an example of display in FIG. 11.

Figure 16:
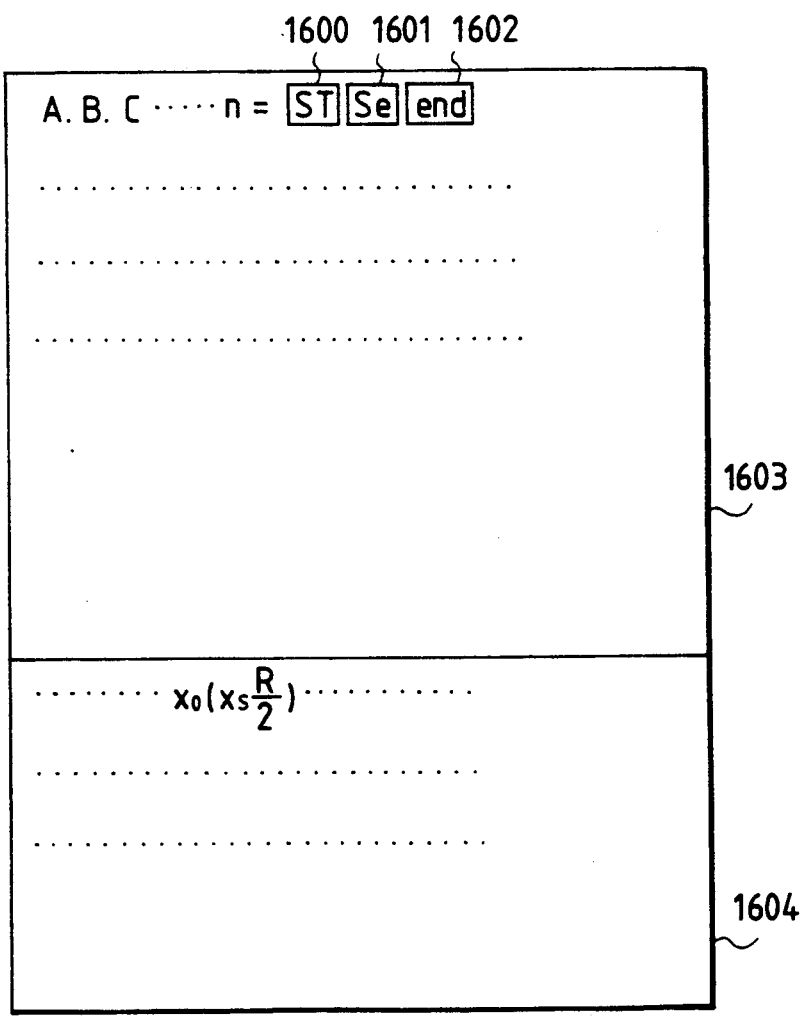
FIG. 16 is a diagram showing an example of the main memory contents.

FIG. 16 shows the structure of a document data area in the main memory 5 shown in FIG. 2. The document data area comprises a text area 1603, in which input commands and character codes are stored. A command ST 1600 denoting fraction command start, a command Se 1601 denoting separator command for separating the denominator from the numerator, and a command end 1602 denoting the end of the fraction are stored therein. The data between ST and Se is a denominator character train, while Se denotes a fraction line 1102. Also, the data between Se and end is a numerator character train. Other formula commands are also stored in the same form. A table 1604 is a position table for storing the position data to display and output the data based on the above commands and document formats. This table is updated every time a formula editing such as described later is performed. The later explanation of the calculation of positions is referring to the updating of this table.

Figure 15:
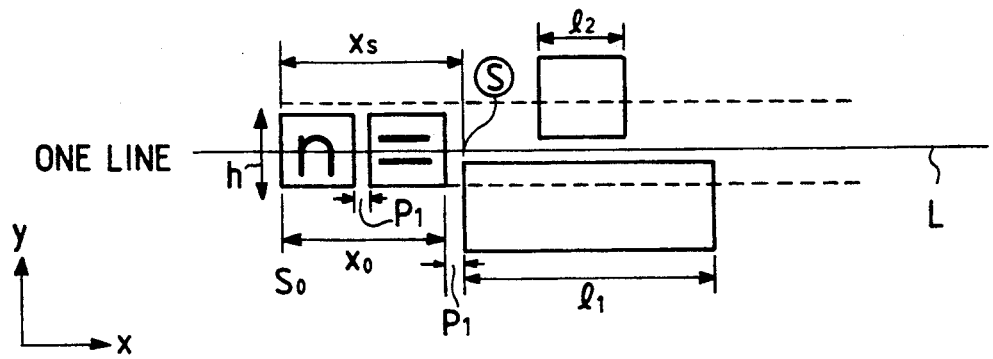
FIG. 15 is a diagram showing an example of a fraction output.

FIG. 15 is a diagram showing the positional relationship between the character train, "n=" and the formula, "1/123" in the example of displayed data shown in FIG. 11.

In the figure, $S_0$ is the start point of the character train on that line. Let it now be supposed that its x coordinate is 0, the x coordinate next to the end of the character train, "=", is $x_0$. Thus, the x coordinate $x_S$ of the first point $S$ of the next formula is equal to a value of $x_0$ combined with a character pitch $P_1$. Both $x_0$ and $x_S$ are, of course, changeable in accordance with the number of characters, character with, and character pitch. The small letter h is the height of a character, while $S$ is a point whose y coordinate is h/2 and x coordinate is $x_S$, or $(x_S, h/2)$, and also serves as a reference point for the base line L of the following formula. In other words, the base line for the formula is newly defined, for example, to a position h/2, by which the formula will not be bottom-aligned with the character train. The $l_1$ is the denominator character train, while $l_2$ is the length of the numerator character train. They are, of course, changeable depending on the number of characters or the like.

Figure 13A:
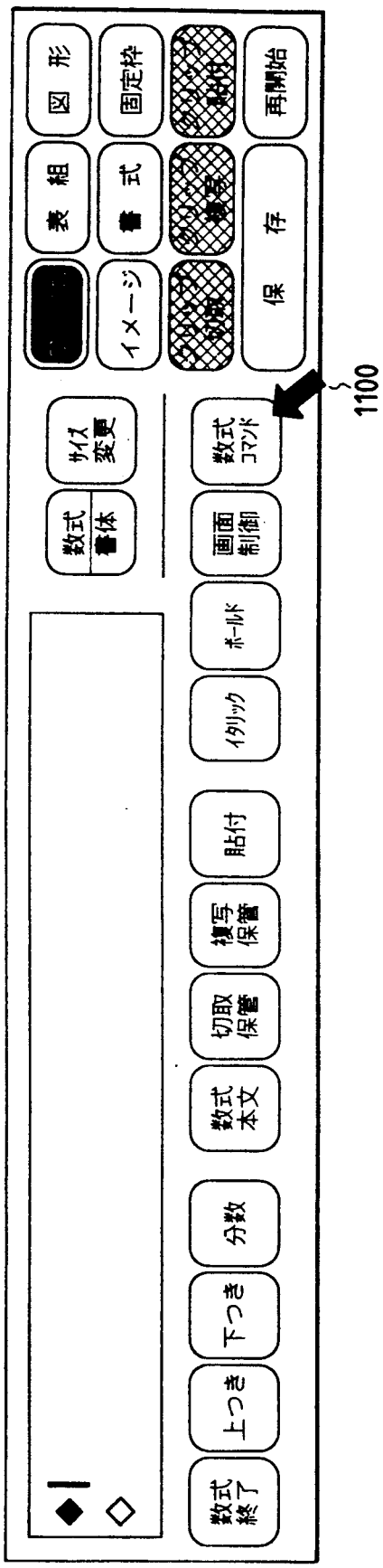
FIGS. 13A and 13B are diagrams showing examples of menu screens of formula commands.
Figure 13B:
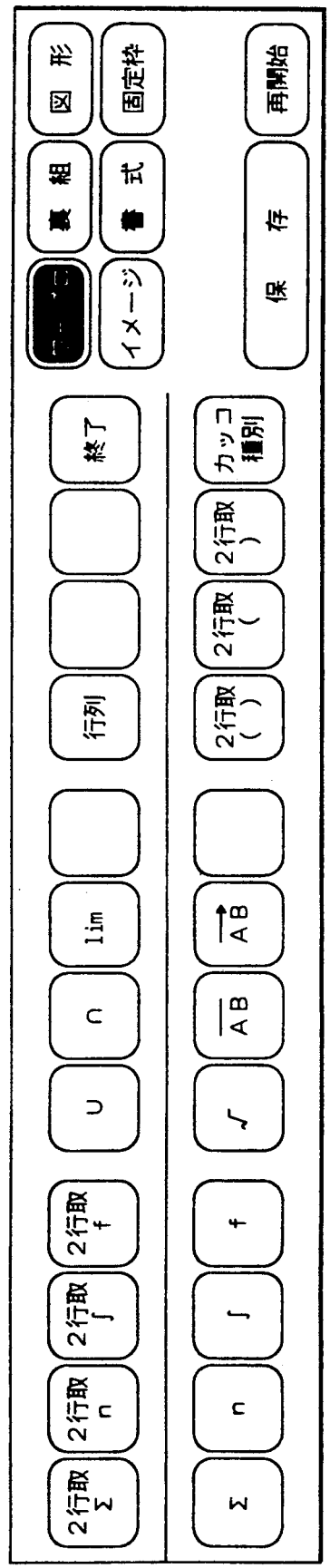

By the way, by repeating the character data input/editing process a plurality of times, it is possible to input "'(1) Input of a formula' (Return) (Return) 'n='" for the document shown in FIG. 11. Then, if the next input involves the formula input/editing process, in other words, "formula" (not shown) in the menu screen is instructed, a menu screen such as shown in FIG. 13A will be displayed. "Fraction" can also be instructed on the same screen, and when "formula command" shown in FIG. 13A is instructed with the cursor, the formula command menu such as shown in FIG. 13B will be displayed. Since the switching operation from the character data input to the formula input can be made by the operator's input/editing operation on the same screen, thereby substantially liberating the operator from being nervous about the input/editing process he or she is currently performing, character data or formula data. Thus, a simple and smooth operation is provided The formula command includes those shown in FIG. 12, each of which serves to create formulas, for example, $$\lim_{n \to \infty} , \overset{m}{\underset{k=0}{U}} ,$$

when performed. Switching the commands as shown in FIG. 13B may be performed by instructing with the cursor 1100. A procedure of creating a formula is to input data on a character basis from the keyboard as is the case with the character editing process, in accordance with the movement of cursors 1100, 1101.

Figure 14:
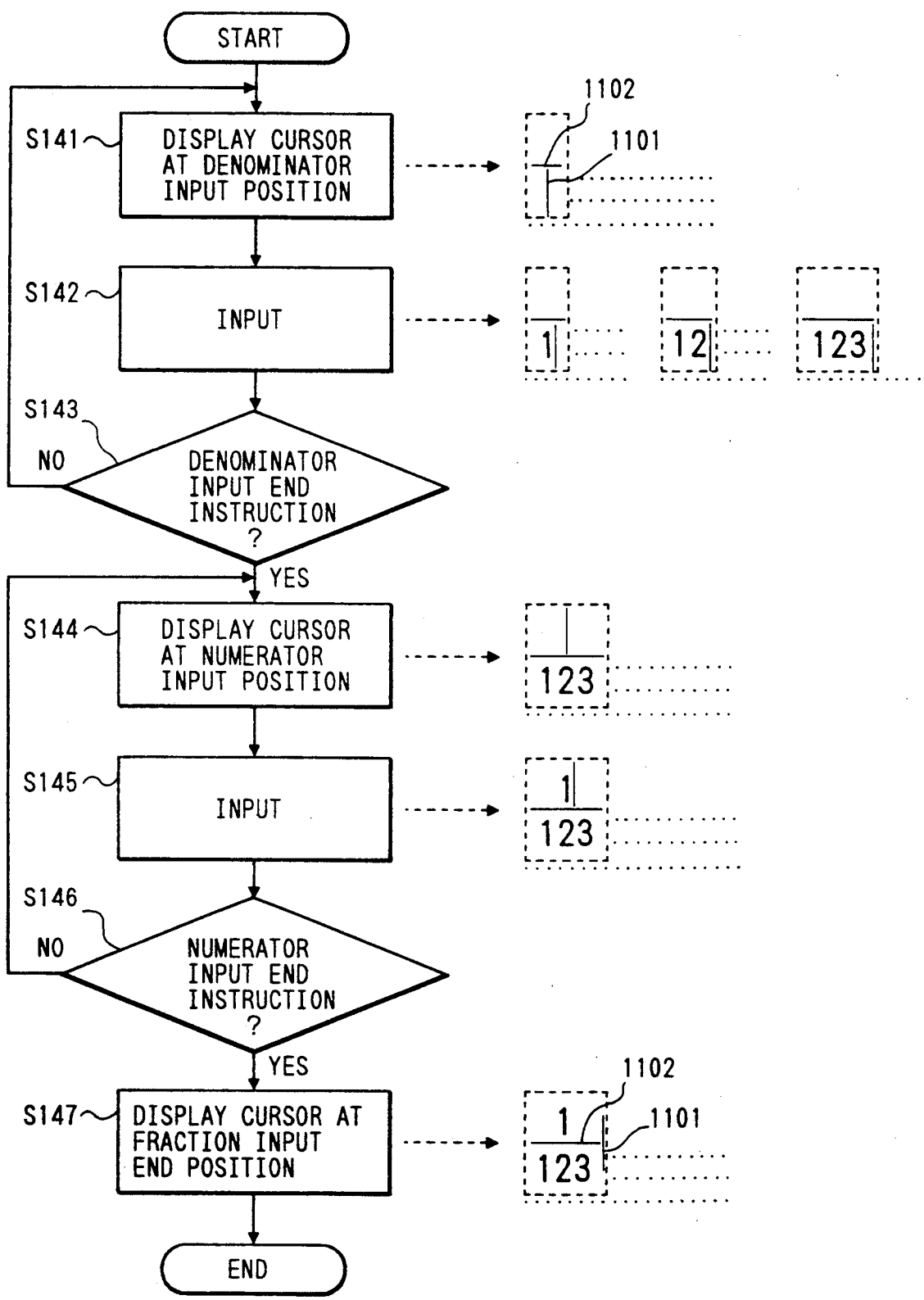
FIG. 14 is a flowchart of the fraction input process and a diagram showing an example of its cursor display.

The fraction input/editing process will now be explained in detail as an example with reference to the flowchart shown in FIG. 14. First, by instructing "formula text" in FIG. 13A, the menu screen as shown therein is displayed. Upon start of the fraction input/editing process by the instruction from the menu screen in FIG. 13A, step S141 displays a vertical cursor 1101 at the denominator input start position (such as shown in the example of step S141 in FIG. 14). In this case, what is stored as text data are only ST, Se, and end, and the cursor indicates the minimum length of a fraction line 1102. The cursor 1101 is displayed so that it is positioned in the middle of the denominator character train portion. That is, the cursor is displayed so that the input start position of the denominator character train is in the x coordinate of $x_s + l_1/2$ (the length of $l_1$ is one character). Although the explanation of the y coordinate is omitted, it will, of course, be positioned in correspondence to the denominator. Step S142 receives input of a numeral or character from the keyboard, the text data becomes, depending on the type of input, in this case [ST] 1,2,3 [Se|end] at the time of end of input of the denominator. Then, a value of $X_s + l_1$ is sequentially calculated so that the cursor 1101 can define the position for the next character input ($l_1$, which increases at every character input, must be added at every input.)

The fraction line 1102 is redisplayed in accordance with the length of $l_1$1. Then, step S143 instructs the end of denominator input, that is, upon operation of the cursor movement key in the direction either upward or to the right, meaning that a numerator input is ready, the cursor 1101 is displayed at a position of $x_S + l_1/2$ so as to indicate the numerator input and display position. The y coordinate is, of course, the position for displaying the numerator (See the example shown in S144 in FIG. 14).

Then, step S145 updates the cursor position at every numerator data input, and the character trains are so arranged and displayed that the center of the denominator character train coincides with that of the numerator character train. In the case of step S145 in FIG. 14, the number of numerator data to be input is one; but if there are two inputs, the data will be 11/123; if there are five inputs, the data will be 11111/123, whereby not only the fraction can be displayed in a well-balanced manner but also operations of inputting, confirming, and editing data can be performed interactively. When the fraction input end is instructed, or, for example, the cursor movement in the right direction is instructed, the fraction input end position value is calculated as shown in step S147 in FIG. 14, and then the cursor is displayed at the calculated position. This value in which either one of $l_1$ or $l_2$ that is larger than the other is added to $x_S$ may be used as its x coordinate. Here, by operating the cursor movement keys in directions to the left, upward, and downward, it is possible to re-input numerators and denominators for addition, deletion or the like. If any other command shown in FIG. 13B is input, or step S147 instructs the formula command end, the system gets out of the fraction command, that is, the system moves the pointer to a position next to [end] on the text, and calculates a new cursor position.

Similarly, any formula other than fraction gets its output position defined based on the reference point e,crc/S/ (. mark) and the base line L. FIGS. 17A, 17B show these examples.

FIG. 17A is a diagram showing the output position of a formula symbol of $\Sigma$ (sigma), while FIG. 17B is a diagram shown the display position of a square root, $\sqrt{\phantom{x}}$ (square root). When $$+ \sum_{i=0}^{n}$$

and $\sqrt{123}$ input after the formula $n = 1/123$ shown in FIG. 11, that is, when a plurality of formulas are input, they will be displayed/output in a well-balanced manner by being aligned with the base line L as shown in FIG. 17C. Further, when $$\sum_{i=0}^{n}$$

and $+\sqrt{123}$ is input in place of the numerator character train 1 of the formula $n = 1/123$, they will be displayed without losing the balance for both denominator and numerator as shown in FIG. 17D, and both $$\sum_{i=0}^{n}$$

and 123 are displayed/output in a center-aligned manner with respect to a new base line $L_1$ which is defined by L and the height of the numerator character train.

In this way, any input, simple or complicated, of a formula or of a combination of formulas can readily be displayed in a well-balanced manner through calculation of their respective output positions.

These plurality of formula commands can be controlled by storing respective data of sigma start/end commands and square root start/end commands between the fraction start and end commands on the text shown in FIG. 16, and it is possible to similarly apply the above explanation to the calculation of the base line L by obtaining the reference point S on the numerator and the calculation of the display position for the entire fraction using the previously described numerator character train length $l_2$ for the numerator commands and the character train.

Thus, it is possible to sequentially display a formula or a combination of formulas in a well-balanced manner in accordance with any input, thereby allowing a document process including formulas to be performed interactively.

As described above, according to this invention, the output position for a next input, whether it may be a character or a symbol, is defined, and the cursor is displayed at the defined output position when the formula input/editing process is performed, whereby the operator is liberated from thinking about defining the output positions of numerals and formula symbols which consist of the formulas. Thus this invention has the advantage that the formula input/editing process can be performed in a quick and easy manner.

Further, the calculation of an output position on the basis of a reference point and a base line which are unique to a formula provides not only the advantage that the output can be displayed in a well-balanced manner, but also the further advantage that the correction and addition of the formula, or display of a complicated combination of formulas can be performed with a simple operation.

As described above in detail, according to this invention, it has been made possible to provide a word processor capable of making a composition in which the arrangement of symbols such as formulas and that of character trains are well-balanced and aligned.

When the process of inputting and editing a character train including formula symbols such as fractions, square roots, matrices, brackets, $\Sigma$, and $\int$ (integral) is performed, the character train will become too large to be within a line spacing, whereby a composition rule different from the ordinary composition rule must be employed.

Figure 18:
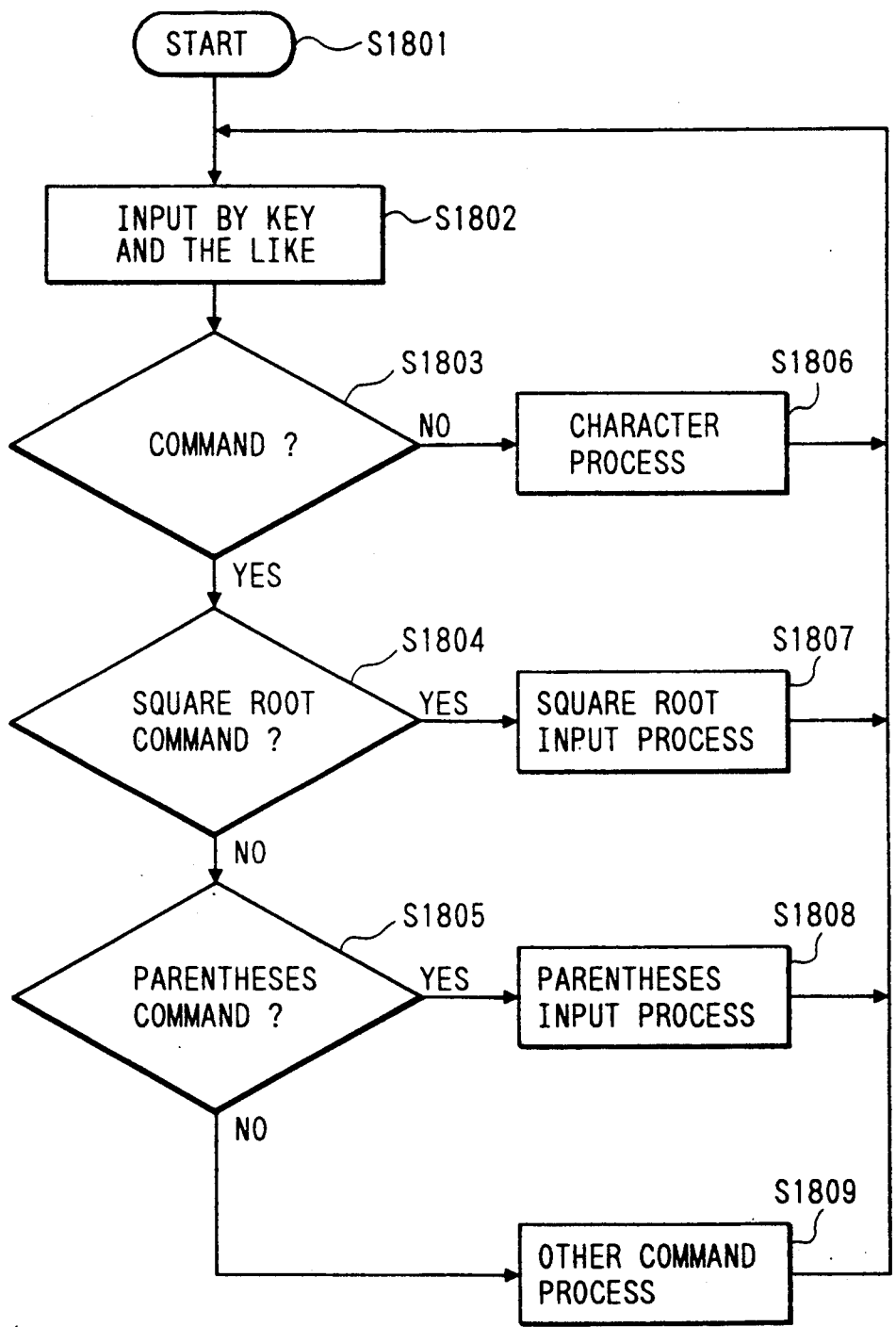
FIG. 18 is a flowchart of the main control.

There now follows an explanation of a method of inputting a formula symbol according to the word processor of this invention, taking an example of a character train with a square root. FIG. 18 is a flowchart showing the main control of the word processor, while FIG. 19 is a flowchart showing the input control of the character train with a square root, and steps S1901 to S1913 correspond to the part of "square root input process" in step S1807 of FIG. 18.

Figure 19:
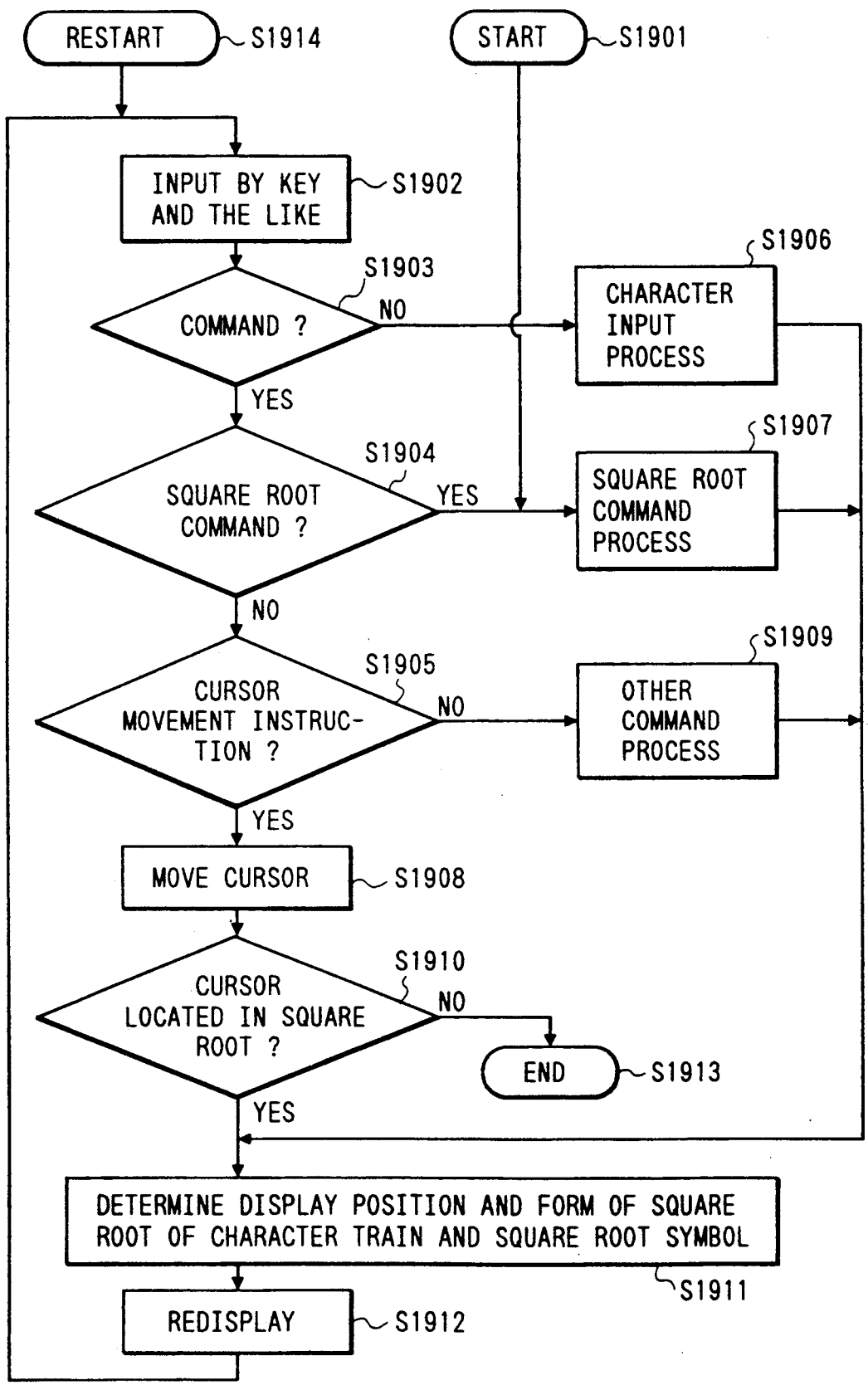
FIG. 19 is a flowchart of the square root input control.

Upon input of the square root command as an "input from keyboard or the like" in step S1802 in FIG. 18, the system starts to perform step S1901 in FIG. 19 after going through steps S1803 and S1804. Step S1907, "square root command process", waits for an input to be placed within a square root so that any character train to be input thereafter will be processed as the input to be placed within the square root. Steps S1911 and 1912 serve to search for a square root symbol large enough to add a character thereto in the document data area of the main memory, while from the font area a pattern corresponding thereto is written to VRAM to display the square root symbol at the display start position on the screen.

Then, when a character train to which a square root symbol is added is input, steps S1906, S1911, and S1912 perform a process so that a square root symbol large enough to accommodate the increasing size of the character train with any additional character is defined and the display positions for the square root symbol and the character train is calculated and displayed. Similarly, on deleting a character or a character train, a square root symbol small enough to accommodate the remaining character or character train is defined, and the display positions for the square root symbol and character train are calculated and displayed.

Furthermore, when a command-instructed symbol or the like is input inside a square root symbol, any character train to be input between the start command and the end command is processed as a blocked, command-instructed character train inside the square root symbol.

To complete the input inside the square root symbol, it is required to move the cursor outside the square root symbol, and an ordinary input process can be resumed without any special operation.

If the cursor is returned inside the square root symbol, step S1809, "other command process", in FIG. 18 checks that the cursor is inside the square root symbol, and step S1914 of FIG. 19 resumes "restart" operation to allow an editing operation such as correction of the character train inside the square root symbol to be performed with, of course, corresponding correction of size, form, and display position of the square root symbol.

Figure 20A:
FIGS. 20A to 20E are diagrams showing data structures of the characters with a square root.
Figure 20B:
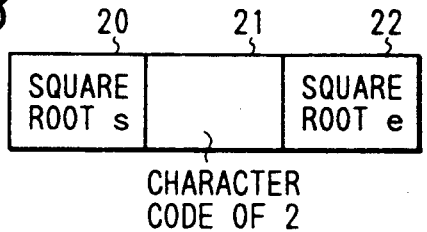

FIGS. 20A to 20E are examples of the composition of character trains with a square root symbol. The following refers to the character train shown in FIG. 20A as a simple example. FIG. 20B is the character code train to be stored in the document data area of the main memory in correspondence with the character train shown in FIG. 20A.

Figure 20C:
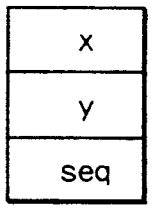
Figure 20D:
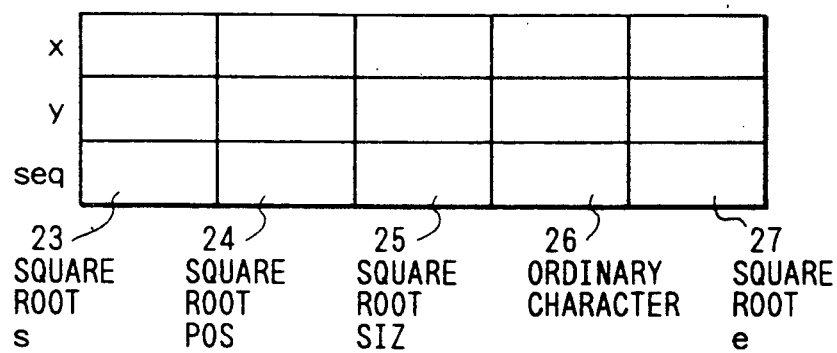
Figure 20E:
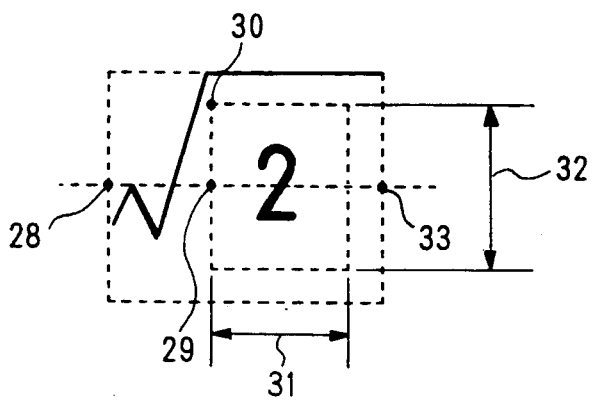

The character code train comprises a square root start command 20, in which a special code to be easily discernible from an ordinary character is stored; a character code string 21 for a character train with a square root ("2" in the example of FIG. 20A), and more particularly, a code such as JIS6226 is stored; a square root end command code 22, in which a special code such as the square root start command is stored. The composition of the character train with a square root is defined on the basis of the position information (character information table), according to which the character train and symbol stored in the work area of the main memory are to be output, and which is created based on this character code train. FIG. 20C is a unit of a character information table which will be described later with reference to FIG. 20D; x and y respectively storing values such as position coordinates. "seq" stores a special code denoting the type of command or the like. FIGS. 20D is character information table created by the character code train of FIG. 20B. A table of FIG. 20D is created by using a size unique to the character string in FIG. 20A shown in FIG. 20E. Column 23 stores character information relative to the square root command; x and y respectively storing the x and y coordinates of the position shown by reference numeral 28 in FIG. 20E and indicating the start position for the square root, while "seq" stores a special code denoting the character information of the square root start command. Column 24 stores information of the position coordinates of the character train with a square root; x and y store the x and y coordinates for a point 30 shown in FIG. 20E, while "seq" stores the special code denoting the position coordinates of the character with a square root. Column 25 stores length information of the character with a square root; x and y respectively storing the lengths 31, 32, while "seq" stores a special code denoting the length information of the character with a square root.

Figure 21:
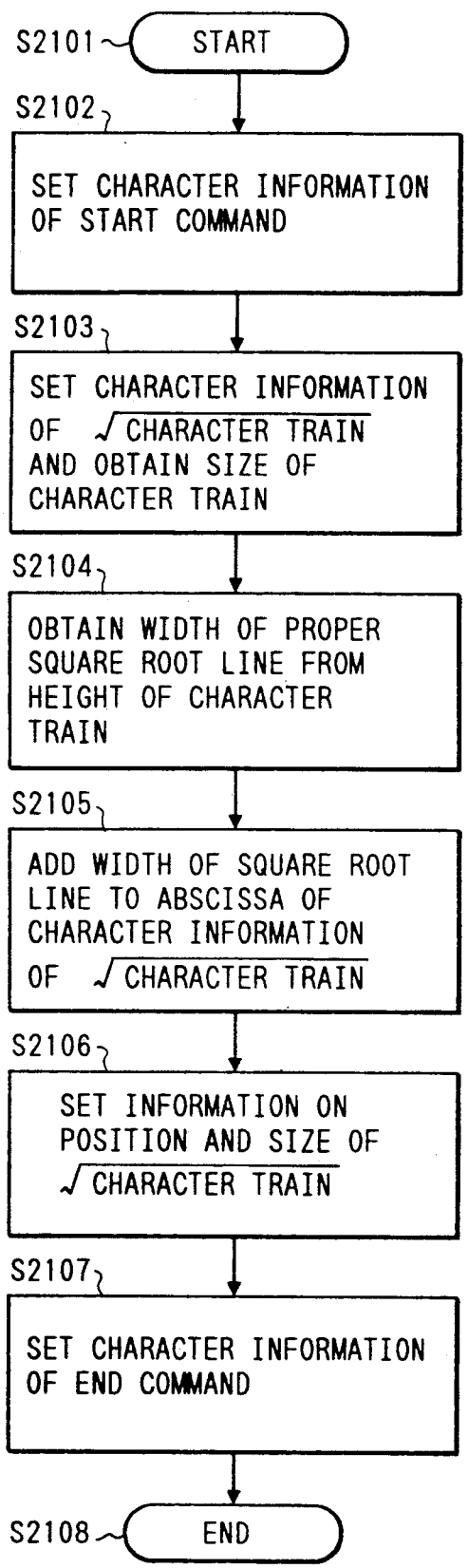
FIGS. 21 is a flowchart of a character-train-with-square-root creation process.

Column 26 stores the position coordinates of the character with a square root. Since the character train in the example of FIG. 20A is only "2", the information stored is only for one character. The x and y store the x and y coordinates of the position of the character "2" (29 in FIG. 20E), while "seq" stores a special code denoting that the character information refers to the ordinary character. Column 27 stores character information of the square root end command; x and y respectively storing the coordinates of the square root end position, that is, the x and y coordinates of point 33 shown in FIG. 20E, while "seq" stores a special code denoting that the character information refers to the square root end command. FIG. 21 is a flowchart showing a square root composition control and its steps S2101 to S2107 correspond to step S1911 in FIG. 19. Referring now to the examples of the square root shown in FIGS. 20A to 20E, how the character information table is written in the work area of the main memory 5 will be explained.

Figure 22:
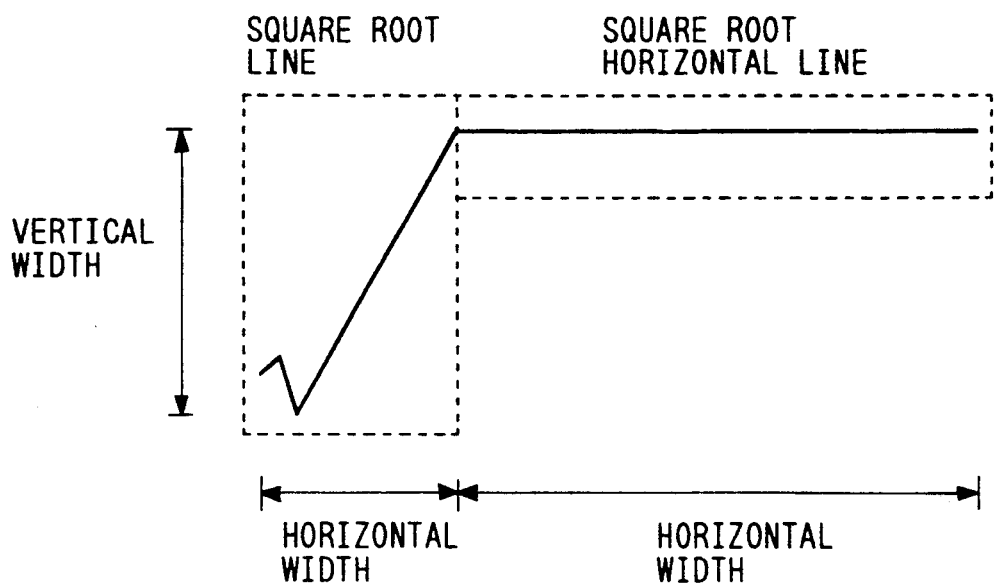
FIG. 22 is a diagram showing names of respective parts of a square root symbol.

Here, a square root can be broken down into two portions: a "square root line" and a "square root horizontal line", as shown in FIG. 22. A "vertical width" of the "square root line" and a "horizontal width" of the "square root horizontal line" shown in FIG. 22 are respectively defined in accordance with the "height" and "length" of a character train to which a square root symbol is to be added. Also, the form of "square root line" including its "horizontal width" is to be defined with no variation by the "vertical width".

Figure 23:
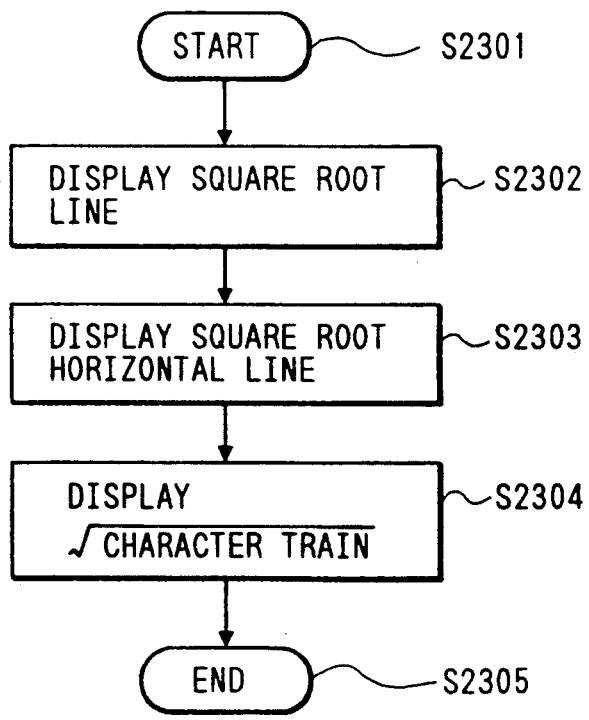
FIG. 23 is a flowchart of the character-train-with-square-root display process.

First, step S2102 sets the character information of the square root start command. Then, step S2103 sets the character information of the character train with a square root, and the length of the character train is calculated. However, the horizontal width of the square root line varies in accordance with the vertical width of the square root line which will be calculated later, and the position of the character train with a square root likewise varies in accordance therewith, whereby in this step, it is the coordinates information of the square root start position (point 28 in FIG. 20E) that is first set as the head position coordinates information of the character train. From the relative position with respect to the character train, the position coordinates information of the characters following the head character will then be set. Then, step S2104 calculates the square root line with a vertical width commensurate with the height of the character train set in step S2103, while step S2105 adds, to the x coordinate information out of the position information for each character of the character train with a square root, the horizontal width just obtained, whereby the resultant position of the character train with a square root has moved to the right by the horizontal width of the square root line. Then, step S2106 sets the position and length information of the character train with a square root which can be calculated by steps up to step S2105, while step S2107 sets the character information of the root end command. Then, a flowchart in FIG. 23 showing how the character train is controlled and displayed using the information stored in the character information table created in the work area of the main memory will be explained.

Steps S2301 to S2305 correspond to step S1912 in FIG. 19. Step S2302 calculates and displays the square root line which is sufficiently large selected from among the heights of the character trains stored in the character length information for character trains with a square root on the square root start position stored in the character information of the square root start command. On the other hand, step S2303 adds the square root horizontal line to the square root line by the horizontal width of the character train stored as the length of the character train with a square root. Step S2304 displays "2", which is a character train with a square root, in accordance with the character position information.

Then, another method of creating a character train with a square root, in which the input of the character train precedes the square root, will now be explained.

First, a character train to which a square root symbol is to be added is input, and this character train is range-designated with an instruction that a square root be added. Then, from the length of the range-designated character train the size of the square root symbol which can accommodate the character train is calculated together with the display position of the character train, and the character train with a square root will be displayed.

Also, the above method is applicable when trying to add a square root to a part of the character train already input.

A method of inputting a character train including parentheses using a parentheses command will now be explained.

Figure 24:
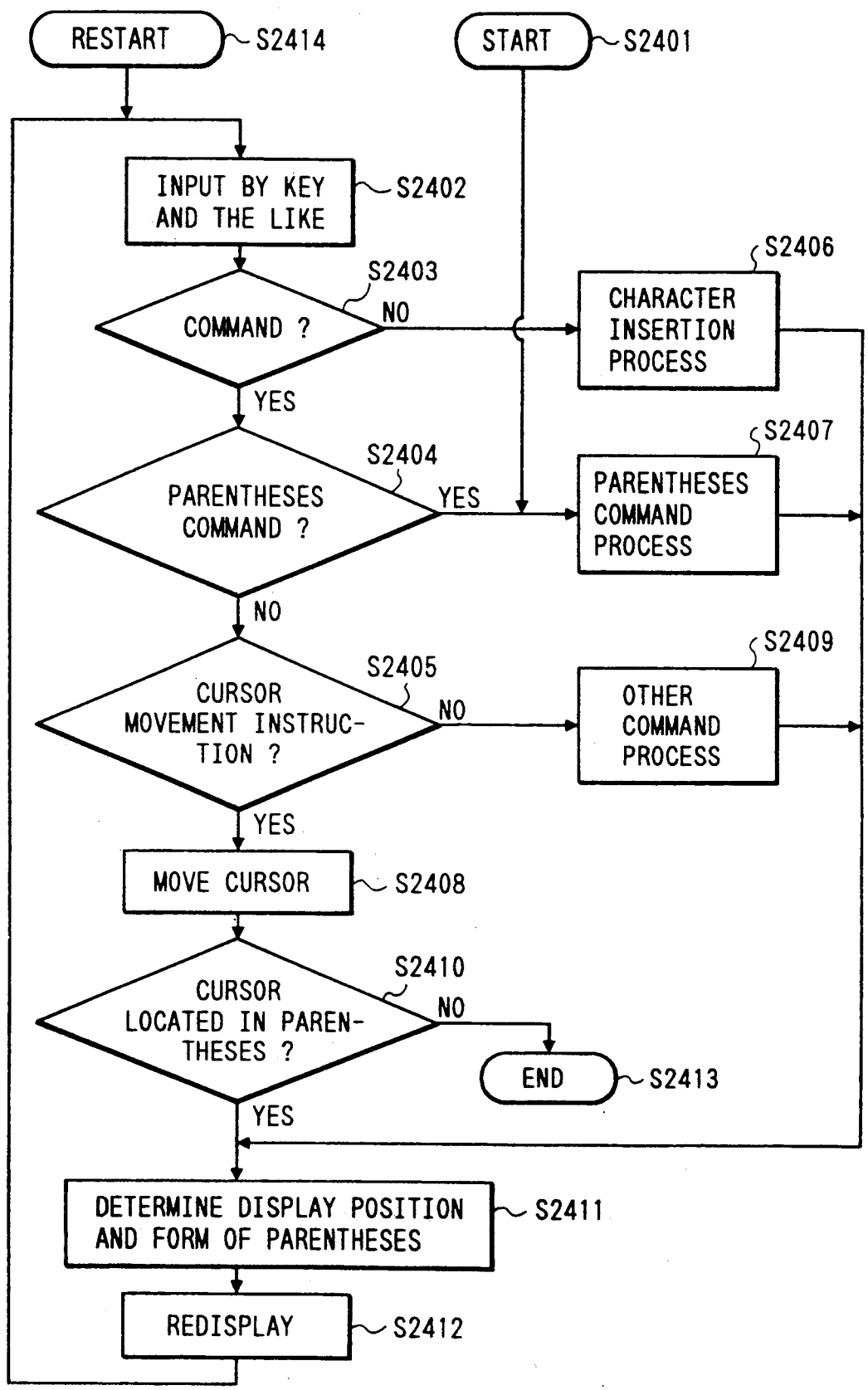
FIG. 24 is a flowchart of the parenthesis input control.
Figure 25A:
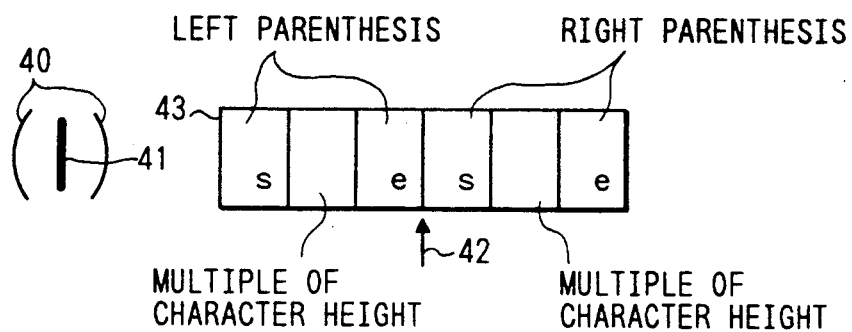
FIGS. 25A, 25B and FIGS. 26A, 26B are diagrams showing data structures of the parenthesized character train.
Figure 25B:
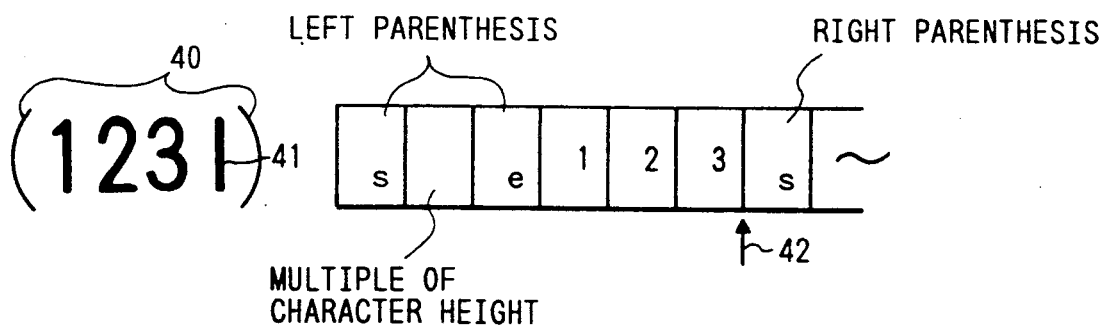

FIG. 24 is a flowchart showing the parenthesis input control; steps S2401 to S2413 correspond to "parentheses input process" in step S1808 in FIG. 18. FIGS. 25A and 25B show examples of parentheses inputs using the parentheses command; FIG. 25A show the display condition on the screen and the character code train immediately after the input process has been performed with the parentheses command.

FIGS. 25A and 25B show both right and left parentheses 40; the character cursor 41 indicating the character input position; the character data train 43 for the right and left parentheses, both right parenthesis and left parenthesis consisting of a parenthesis start command code, information of parenthesis height in terms of the multiple of the height of one character (hereinafter referred to as "multiple of character height"), and a parenthesis end command code. Reference numeral 42 is the character cursor position, one which a next input will be inserted. FIG. 25B shows the display condition and the character code train when some characters are input between the parentheses. A character train "123" is inserted between the left parenthesis end and the right parenthesis start.

The input of the character train is completed by putting the cursor out of the parentheses. If the cursor is caused to move back inside the parentheses, "other command process" in step S1809 of FIG. 18 checks that the cursor is inside the parentheses and step S2414 in FIG. 24 resumes "restart" operation to allow an editing operation such as correction of the character train inside the parentheses to be performed.

Figure 26A:
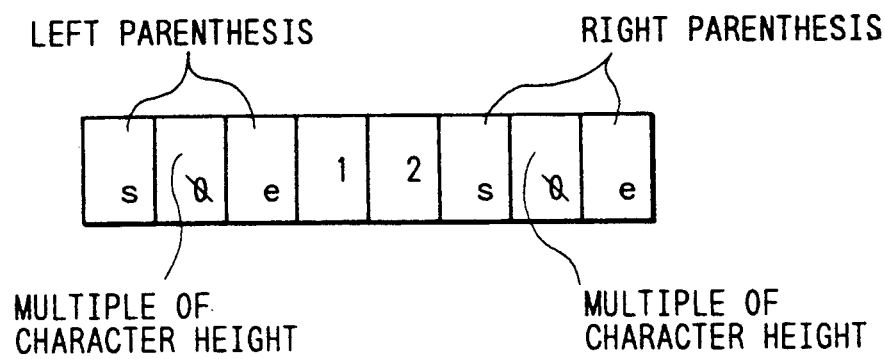
Figure 26B:
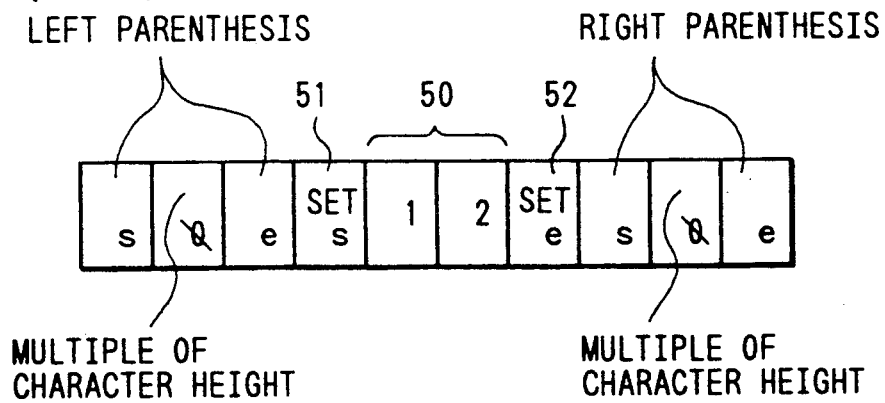

Then, parentheses whose heights are automatically adjustable according to the height of a character train (hereinafter referred to as "automatic parentheses") will now be explained. The examples shown in FIGS. 26A and 26B are conceivable as a display type; they differ from the previous parentheses only in the commands. Their input control is the same as in the input process of parentheses in the parentheses command. FIGS. 26A and 26B are a display form (FIG. 26A) and a display example and its character code train (FIG. 26B). Similarly to a pair of ordinary parentheses, a pair of automatic parentheses consist of the parentheses start command code, the multiple of character height, and the parentheses end command code. The "0" is set in the multiple of character height of the automatic parentheses to distinguish it from the multiple-of-character-height-instructed parentheses. The height of the parentheses in FIG. 26A, for example, the left parenthesis, is defined by a multiple of character height commensurate with the height of the character right to its end command, while the height of the right parenthesis is defined by a multiple of character height commensurate with the height of the character left to its start command. However, if the character to be referred to for defining the multiple of character height is a command such as a square root or a fraction, the entire size of the command, that is, the entire size of the square root or the fraction is accounted for in the definition of the multiple of character height of the parentheses.

A method of displaying the parentheses in uniform height if the character to the right of the left parenthesis and the character to the left of the right parenthesis are different will now be explained. FIG. 26B shows an example in which the heights of both parentheses are aligned even if the height of the character to the right of the left parenthesis and that of the character to the left of the right parenthesis are different. A character train 50 made up of characters of different height is surrounded by the set command start 51 and the set command end 52. Thus, the character to the right of the left parenthesis and the character to the left of the right parenthesis consist of the same character train surrounded by the set commands, and the heights of the left parenthesis and right parenthesis are made uniform to align both parentheses.

In a similar manner to the ordinary parentheses, the input of the automatic parentheses can be completed by putting the cursor out of the parentheses; by moving the cursor back into the parentheses it is possible to perform an editing operation of the input such as correction, and if the height of the character train changes, so do the heights of the parentheses.

As explained above, this invention provides the following advantages.

In the composition of formulas or the like, (1) it is possible to add a symbol to a character train and display them in a well-balanced manner without bothering the operator in considering the size or the like during an editing operation such as input and correction by constructing means for automatically setting the size of the symbol to be added to the character train, the display position of the symbol to be added, and the character train itself in accordance with the length of the character train;

(2) it is possible to reduce errors of missing one of paired symbols which are arranged mutually spaced apart by enabling them to be input simultaneously; and (3) it is possible to simplify the symbol input operation and thus reduce operational errors.

We claim:

1. A word processor comprising:
input means for inputting characters and symbols;
storing means, connected to said input means, for storing the characters and symbols input by said input means;
display means, connected to said storing means, for displaying the characters and symbols stored by said storing means;
designating means, connected to said storing means for designating a range of formula in a text comprising the characters and symbols stored by said storing means;
editing means, connected to said display means and said storing means, for adding, deleting, an correcting the characters and symbols displayed by said display means;
updating means connected to said storing means, for updating the range of formula when the characters an symbols in the range of formula are edited by said editing means; and
control means for relocating the range of formula while maintaining its arrangement of the characters or symbols unchanged on the display means when the characters and symbols outside of the range of formula are edited by said editing means.

2. A word processor according to claim 1, further comprising instructing means, connected to said designating means, for instructing start and end of inputting a formula; and wherein
said designating means designates a character and symbols input after the start of inputting a formula instructed until the end of inputting the formula instructed by said instructing means.

3. A word processor comprising:
input means for inputting formula data;
storing means, connected to said input means, for storing the formula data input by said input means;
output means, connected to said storing means, for outputting the formula data stored by said storing means;
output control means, connected to said storing means and output means, for arranging each term of formula input by said input means in its center aligned in a line direction on said output means; and
editing means, connected to said storing means, for adding, deleting, and correcting the formula stored by said storing means,
wherein said output control means rearranges the terms of the formula by altering their center in response to editing by said editing means.

4. A word processor comprising:
input means for inputting formula data comprising formula symbols, values, and variables;
storing means, connected to said input means, for storing the formula data input by said input means;
output means, connected to said storing means, for outputting the formula data stored by said storing means;
setting means, connected to said storing means and said output means, for setting a variable range in said storing means according to a formula symbol of a specific kind stored in said storing means;
output control means, connected to said storing means and said output means, for arranging values and variables symmetrically with respect to both right and left positions within the variable range on said output means; and
editing means connected to said storing means, for adding, deleting, and correcting the formula data stored by said storing means,
wherein said output control means rearranges values and variables edited by said editing means within the variable range.

5. A word processor comprising:
input means for inputting a character and a symbol;
storing means, connected to said input means, for storing the character and symbol input by said input means;
output means, connected to said storing means, for outputting the character and symbol stored by said storing means;
checking means, connected to said input means, for checking that the symbol input by said input means is a kind of symbol to be added to other characters or symbols of variable lengths or heights;
determining means, connected to said storing means and said checking means, for determining a range of characters or symbols which will be subject to addition of the symbol checked by said checking means;
first calculating means, connected to said output means and said determining means, for calculating an output position and form on said output means of the symbol checked by said checking means in accordance with the range determined by said determining means;
second calculating means, connected to said output means, said determining means, and said first calculating means for calculating an output position on said output means of characters or symbols in the range determined by said determining means in accordance with the output position and form of the symbol calculated by said first calculating means; and
said output control means outputting characters and symbols in accordance with the output positions and forms calculated by said first and second calculating means.

6. A word processor according to claim 5, further comprising:
setting means, connected to said output means, for setting an area where characters or symbols which will be subject to addition will be input on said output means according to the symbol checked by said checking means; and wherein said determining means determines a character and a symbol input in the area set by said setting means as an object for addition.

7. A word processor according to claim 5, further comprising:
designating means, connected to said output means, for designating a character or symbol on said output means; and
wherein said determining means determines the character or symbol designated by said designating means as an object for addition.

8. A word processor according to claim 5, wherein said symbol to be added to other characters or symbols of variable lengths or heights includes a pair of parentheses.

9. A word processor according to claim 5, further comprising:
symbol input means, connected to said storing means, for simultaneously inputting a pair of symbols which are arranged mutually spaced apart.

10. A method for word processing comprising the steps of:
inputting characters and symbols;
storing the input characters and symbols input in a memory;
displaying on the display the characters and symbols stored in the memory;
designating a range of a formula in a text comprising the characters and symbols stored in the memory;
editing the characters and symbols displayed on the display;
updating the range of formula when the characters and symbols in the range of formula are edited; and
relocating the range of formula while maintaining its arrangement of the characters and symbols unchanged on the display when the characters and symbols outside of the range of formula are edited.

11. A method for word processing comprising the steps of:
inputting formula data;
storing the input formula data in a memory;
outputting the formula data stored in the memory by arranging each term of the formula in its center aligned in the line direction;
editing the formula stored in the memory; and
rearranging the terms of the formula by altering their center in response to editing in said editing step.

12. A method for word processing comprising the steps of:
inputting formula data comprising formula symbols, values, and variables;
storing the input formula data in a memory;
setting a variable range according to a formula symbol of a specific kind stored in the memory;
outputting the formula data stored in the memory by arranging values and variables symmetrically with respect to both right and left positions within the variable rang;
editing the formula data stored in the memory; and
rearranging edited values and variables within the variable range.

13. A method for word processing comprising the steps of:
inputting a character and a symbol;
storing the input character and symbol in a memory;
checking that the input symbol is a kind of symbol to be added to other characters or symbols of variable lengths or heights;
determining a range of characters or symbols which will be subject to addition of the checked input symbol;
calculating an output position and form of the checked symbol in accordance with the determined range;
calculating an output position of characters or symbols in the determined range in accordance with the output position and the form of the symbol calculated; and
outputting characters and symbols in accordance with the output positions and forms calculated.

* * * * *

UNITED STATES PATENT AND TRADEMARK OFFICE
CERTIFICATE OF CORRECTION

PATENT NO. : 5,122,953　　　　　　　　　　　　Page 1 of 3

DATED : June 16, 1992

INVENTOR(S) : AKIHIKO UEKUSA, ET AL.

It is certified that error appears in the above-identified patent and that said Letters Patent is hereby corrected as shown below:

COLUMN 1

Line 11, "size" should read --size,--.

Line 54, "Ai" should read --"Ai".--.

COLUMN 2

Line 36, "of" should read --of the--.

COLUMN 3

Line 3, "work" should read --word--.

COLUMN 7

Line 14, "word" should read --words--.

Line 19, "of" should read --of a--.

UNITED STATES PATENT AND TRADEMARK OFFICE
CERTIFICATE OF CORRECTION

PATENT NO. : 5,122,953
DATED : June 16, 1992
INVENTOR(S) : AKIHIKO UEKUSA ET AL.

It is certified that error appears in the above-identified patent and that said Letters Patent is hereby corrected as shown below:

COLUMN 8

Line 40, "provided" should read --provided.--.

Line 63, "end, and" should read -- end, and --.

COLUMN 9

Line 6, "case" should read --case,--.

Line 14, "$1_1 1.$" should read --$1_1.$--.

Line 53, "e,crc/S/" should read --Ⓢ--.

Line 57, "shown" should read --showing--.

COLUMN 10

Line 27, "reference point S" should read --reference point Ⓢ--.

Line 44, "Thus" should read --Thus,--.

UNITED STATES PATENT AND TRADEMARK OFFICE
CERTIFICATE OF CORRECTION

PATENT NO. :     5,122,953

DATED      :     June 16, 1992

INVENTOR(S) :    AKIHIKO UEKUSA ET AL.

It is certified that error appears in the above-identified patent and that said Letters Patent is hereby corrected as shown below:

COLUMN 15

Line 34, "an" should read --and--.

Line 39, "an" should read --and--.

COLUMN 18

Line 18, "rang;" should read --range;--.

Signed and Sealed this

Twenty-first Day of September, 1993

Attest:

BRUCE LEHMAN

Attesting Officer

Commissioner of Patents and Trademarks